US012577786B2

(12) United States Patent
Mast

(10) Patent No.: US 12,577,786 B2
(45) **Date of Patent: *Mar. 17, 2026**

(54) INSULATED DECORATIVE PANEL FOR A WALL TREATMENT

(71) Applicant: Rock Decor Company, Apple Creek, OH (US)

(72) Inventor: Ricky D. Mast, Apple Creek, OH (US)

(73) Assignee: Rock Decor Company, Apple Creek, OH (US)

( * ) Notice: Subject to any disclaimer, the term of this patent is extended or adjusted under 35 U.S.C. 154(b) by 393 days.

This patent is subject to a terminal disclaimer.

(21) Appl. No.: 18/302,844

(22) Filed: Apr. 19, 2023

(65) Prior Publication Data

US 2024/0352741 A1 Oct. 24, 2024

(51) Int. Cl.

| | |
|---|---|
| ***E04B 2/00*** | (2006.01) |
| ***B28B 23/00*** | (2006.01) |
| ***E04F 13/08*** | (2006.01) |

(52) U.S. Cl.

CPC ........ *E04F 13/0835* (2013.01); *B28B 23/005* (2013.01); *E04F 13/0875* (2013.01); *E04F 13/0892* (2013.01); *E04F 2201/0107* (2013.01); *E04F 2201/05* (2013.01)

(58) Field of Classification Search

CPC .............. E04F 13/0835; E04F 13/0875; E04F 13/0892; E04F 2201/05; B28B 23/005; B28B 23/0062

See application file for complete search history.

(56) References Cited

U.S. PATENT DOCUMENTS

| | | | | |
|---|---|---|---|---|
| 2,120,195 | A | 6/1938 | Valenti | |
| 3,936,987 | A * | 2/1976 | Calvin | E04B 2/08 52/309.1 |
| 4,987,712 | A | 1/1991 | Mancuso | |
| 5,819,486 | A | 10/1998 | Goodings | |
| 6,315,489 | B1 | 11/2001 | Watanabe | |
| 6,460,301 | B1 * | 10/2002 | McKee | E04C 2/384 52/235 |
| 7,617,646 | B2 | 11/2009 | Losse | |
| D643,133 | S | 8/2011 | Steffes et al. | |
| 8,042,309 | B2 | 10/2011 | Wolf et al. | |
| 8,042,310 | B2 | 10/2011 | Hikai | |
| 8,141,310 | B2 | 3/2012 | Trezza | |
| 8,782,988 | B2 | 7/2014 | Wolf et al. | |
| D713,552 | S | 9/2014 | Steffes et al. | |

(Continued)

*Primary Examiner* — Basil S Katcheves

(74) *Attorney, Agent, or Firm* — Sand, Sebolt & Wernow Co., LPA

(57) ABSTRACT

An insulated panel for a wall treatment and a method of manufacture thereof. The panel includes a panel block cast from a material. During casting, a first bracket, a second bracket, and an insulator block are partially embedded within the material. The insulator block, which is a lighter weight foam material, is embedded between the first and second brackets such that part of the insulator block will extend beyond a rear of the panel block once cast. Once cast, part of the first bracket extends upwardly beyond a top of the panel block and part of the second bracket angles downwardly and outwardly from the rear of the panel block and a distance below the insulator block. The second bracket is used to align the panel on a support surface. The first bracket is used to secure the panel to the support surface.

15 Claims, 17 Drawing Sheets

(56) References Cited

U.S. PATENT DOCUMENTS

| | | | | | |
|---|---|---|---|---|---|
| D713,974 | S * | 9/2014 | Steffes | D25/61 | |
| 8,997,423 | B2 | 4/2015 | Mann | | |
| D742,034 | S | 10/2015 | Steffes et al. | | |
| D742,035 | S | 10/2015 | Steffes et al. | | |
| 9,169,652 | B2 | 10/2015 | Steffes et al. | | |
| 9,869,098 | B2 | 1/2018 | Steffes et al. | | |
| D809,671 | S | 2/2018 | Steffes et al. | | |
| 9,903,124 | B2 | 2/2018 | Wolf et al. | | |
| 10,329,775 | B2 | 6/2019 | Wolf et al. | | |
| D857,922 | S | 8/2019 | Steffes et al. | | |
| 10,378,216 | B2 | 8/2019 | Wolf et al. | | |
| 10,557,273 | B2 | 2/2020 | Wolf et al. | | |
| 10,682,787 | B2 | 6/2020 | Steffes et al. | | |
| 10,895,077 | B2 * | 1/2021 | Smith | E04F 13/0816 | |
| D910,207 | S * | 2/2021 | Steffes | D25/61 | |
| 11,047,134 | B2 | 6/2021 | Steffes et al. | | |
| 11,434,645 | B2 | 9/2022 | Mast | | |
| 2008/0155922 | A1 | 7/2008 | Wolf | | |
| 2009/0193742 | A1 * | 8/2009 | Wolf | B29C 39/36 | 52/311.1 |
| 2010/0218447 | A1 * | 9/2010 | Gehring | B28B 7/007 | 52/745.19 |
| 2010/0281784 | A1 * | 11/2010 | Leo | E04B 5/48 | 52/633 |
| 2011/0175255 | A1 | 7/2011 | Wernette et al. | | |
| 2011/0239578 | A1 | 10/2011 | Wolf | | |
| 2012/0117904 | A1 | 5/2012 | Bouchard et al. | | |
| 2012/0241574 | A1 | 9/2012 | Uota et al. | | |
| 2012/0272598 | A1 * | 11/2012 | Wilkie | E04F 13/0892 | 52/302.1 |
| 2014/0109504 | A1 * | 4/2014 | Steffes | E04F 13/0851 | 52/506.06 |
| 2014/0182225 | A1 * | 7/2014 | Wilkie | E04F 13/0835 | 52/302.1 |
| 2015/0021822 | A1 | 1/2015 | Wolf | | |
| 2015/0191911 | A1 | 7/2015 | Mann | | |
| 2016/0010342 | A1 | 1/2016 | Steffes | | |
| 2016/0040437 | A1 | 2/2016 | Wolf | | |
| 2020/0026343 | A9 | 1/2020 | Bakalash | | |
| 2024/0352741 | A1 * | 10/2024 | Mast | B28B 23/005 | |
| 2024/0352742 | A1 * | 10/2024 | Mast | E04F 13/26 | |

* cited by examiner

INSULATED DECORATIVE PANEL FOR A WALL TREATMENT

TECHNICAL FIELD

This disclosure is directed to surface treatments for walls. In particular, this disclosure is directed to modular panel for use in a wall treatment and to a method of installing the same. Specifically, the panel includes a panel block which is cast to include a partially embedded first bracket and a partially embedded second bracket that are used to align and secure the panel block to a support surface. The panel may further include an insulator block which is partially embedded in the panel block during casting.

BACKGROUND ART

Building walls using natural stone or brick can be labor intensive, time-consuming, and expensive. It has therefor become fairly common in recent years to, instead, install a wall treatment to a surface in place of natural stone or brick. The wall treatments typically comprise a plurality of modular panels which include fabricated panel blocks with decorative front surface. One of the problems with known wall treatments is that, because of the use of modular panels, there is often a linear uniformity to the end product which may not quite resemble a natural stone wall. Additionally, many of these modular panels are still quite heavy and unwieldy, and may be difficult to install, particularly for less experienced and skilled craftsmen.

SUMMARY OF THE INVENTION

An insulated panel for a wall treatment and a method of manufacturing thereof is disclosed herein. The panel includes a panel block cast from a material. During casting, a first bracket and a second bracket are partially embedded within the material. The first and second brackets are spaced a distance apart from one other based on the intended height of the cast panel block. A lighter weight, foam insulator block is partially embedded in the material between the first and second brackets and such that part of the insulator block extends beyond a rear of the cast panel block. Part of the first bracket extends upwardly beyond a top of the cast panel block and part of the second bracket angles downwardly and outwardly from the rear of the panel block a distance below the insulator block. The angled part of the second bracket is used to align and position the panel on a support surface. The part of the first bracket is used to secure the panel to the support surface.

In one aspect, and exemplary embodiment of the present disclosure may provide a panel for use in a wall treatment, said panel comprising a panel block having a front and a back; an installation assembly engaged with the panel block, wherein said installation assembly is adapted to align and secure the panel block to a support surface; and an insulator block partially embedded in the back of the of the panel block.

In one embodiment, a part of the insulator block may extend outwardly for a distance beyond the back of the panel block. In one embodiment, the panel block may be comprised of a first material and the insulator block may be comprised of a second material, and the second material is lighter in weight than the first material. In one embodiment, the panel block may be comprised of a cementitious material, a composite material, or a combination thereof, and the insulator block may comprised of a foam material. In one embodiment the foam material may be a closed-cell foam and may include an antibacterial additive or coating. In one embodiment, the front of the panel block may be decorative and may have the appearance of a natural stone or a brick.

In one embodiment, the panel may further comprise a first bracket partially embedded within the panel block; a second bracket partially embedded within the panel block a distance from the first bracket; and the insulator block may be located between the first bracket and the second bracket. In one embodiment, the insulator block is centrally located on the rear of the panel block. In one embodiment a first region of the first bracket may extend upwardly beyond a top of the panel block. In one embodiment, the insulator block has a rear surface which may be vertically aligned with a rear surface of the first region of the first bracket. In one embodiment, a portion of the second bracket may extend outwardly from the rear of the panel block a distance away from the insulator block. In one embodiment, the portion of the second bracket may extend outwardly and downwardly at an angle relative to the rear of the panel block. In one embodiment, a tip or free end of the portion of the second bracket may be vertically aligned with a rear surface of the insulator block.

In another aspect, and exemplary embodiment of the present disclosure may provide a method of forming a panel for a wall treatment, said method comprising casting a panel block from a material; partially embedding an insulator block within the material during casting such that a part of the insulator block extends outwardly beyond a surface of the material; and completing the casting by setting or hardening the material.

In one embodiment, the method may comprise casting the panel block from a cementitious material, a composite material, or a combination thereof. In one embodiment, the method further comprises forming the insulator block out of a closed-cell foam material. In one embodiment, the method may further comprise partially embedding a first bracket in the material during casting; partially embedding a second bracket in the material during casting; and locating the insulator block between the first bracket and the second bracket. In one embodiment, prior to casting the panel block the method may further comprise selecting an end height of the panel block for use in the wall treatment; and varying the distance between the first bracket and the second bracket based on the end height. In one embodiment, the method may further comprise selecting a size of the insulator block based on the end height of the panel block. In one embodiment, the method may include retaining a first region of the first bracket out of the material during casting such that the first region extends outwardly beyond a first end of the panel block once casting is completed. In one embodiment, the method may further comprise retaining a portion of the second bracket out of the material during casting such that the portion is oriented at an angle relative to the rear of the panel block once casting is completed, and such that the portion is located a distance below a bottom of the part of the insulator block which extends outwardly from the rear of the panel block.

In another aspect, an exemplary embodiment of the present disclosure may provide a panel for use in a wall treatment, said panel comprising a panel block having a front and a back; an installation assembly engaged with the panel block, wherein said installation assembly comprises a first bracket partially embedded in the panel block; and a second bracket partially embedded in the panel block a distance vertically below the first bracket.

In another aspect, an exemplary embodiment of the present disclosure may provide a method of forming a panel for a wall treatment, said method comprising casting a panel block from a material; partially embedding a first bracket in the material prior to completing the casting; partially embedding a second bracket in the material prior to completing the casting; spacing the second bracket a distance away from the first bracket; and completing the casting by setting or hardening the material.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
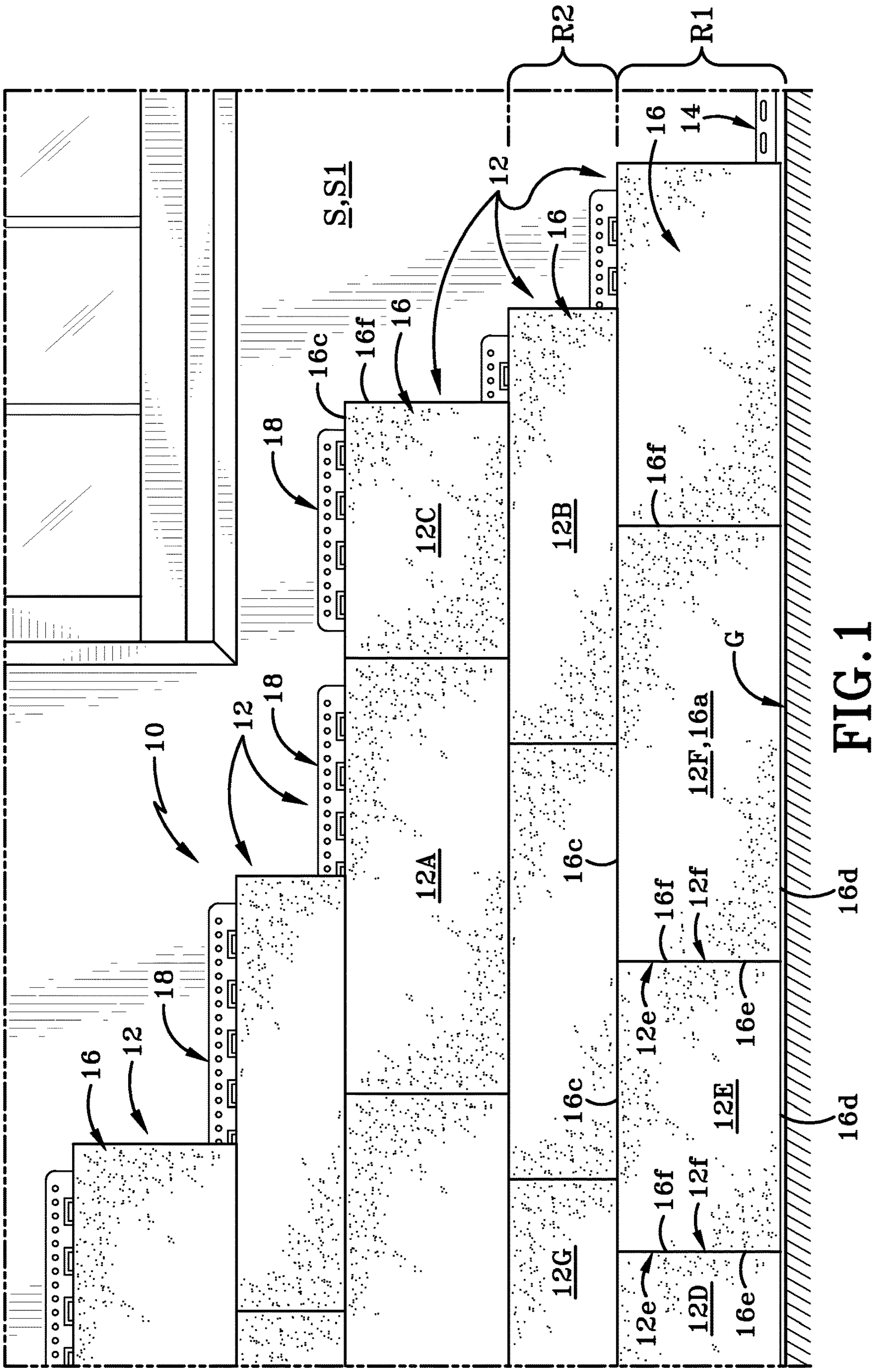
FIG. 1 is a front elevation view of a wall having a plurality of decorative stone veneer panels in accordance with the present disclosure being installed thereon to provide a finish that resembles natural stone.

Referring to FIG. 1, there is shown a decorative wall treatment in accordance with the present disclosure and generally indicated at 10. Wall treatment 10 is shown partially installed on a support structure "S". The support structure "S" may be a wall of a structure or building. The support structure "S" may have been prepared by covering the same with a building wrap, as is well known in the art. The decorative wall treatment 10 comprises a plurality of panels 12 in accordance with the present disclosure which are installed on the wall "S" over building wrap if provided. Wall treatment 10 is illustrated as being assembled from a plurality of differently dimensioned panels 12, such as larger panels 12A, intermediate panels 12B, and smaller panels 12C in order to give the wall treatment 10 a more natural look. It will be understood, however, that in other exemplary panel assemblies, a plurality of the same single size of panel, such as panel 12B, may be used to construct the wall treatment. The wall treatment 10 further comprises a starter strip 14, as will be discussed later herein.

Wall treatment 10 has a front, a back, a top, a bottom, a first side, and a second side. The terms "front", "back", "rear", "top" or "upper", and "bottom" or "lower" as may be used herein are used to describe an orientation of the panels 12 and wall treatment 10 when installed on a support surface "S" and when viewed from the front, as in FIG. 1. The "front" of the wall treatment 10 and of the panels 12 therein is that part of the structure having decorative features which are aesthetically pleasing to the eye. For example, the front of each panel 12 is configured to have the appearance of natural stone or brick and will therefore enable the wall treatment 10 to have the appearance of a natural stone wall or a brick wall. The "back" or "rear" of wall treatment 10 and of the panels 12 therein is that part of the structure which is adjacent the support structure "S". The "bottom" of wall treatment 10 and of the panels 12 therein is that part of the structure which is opposed to and proximate a floor surface oriented at ninety degrees to the support structure "S". The "top" of wall treatment 10 and of the panels 12 therein is that part of the structure which is remote from the floor surface.

Figure 2:
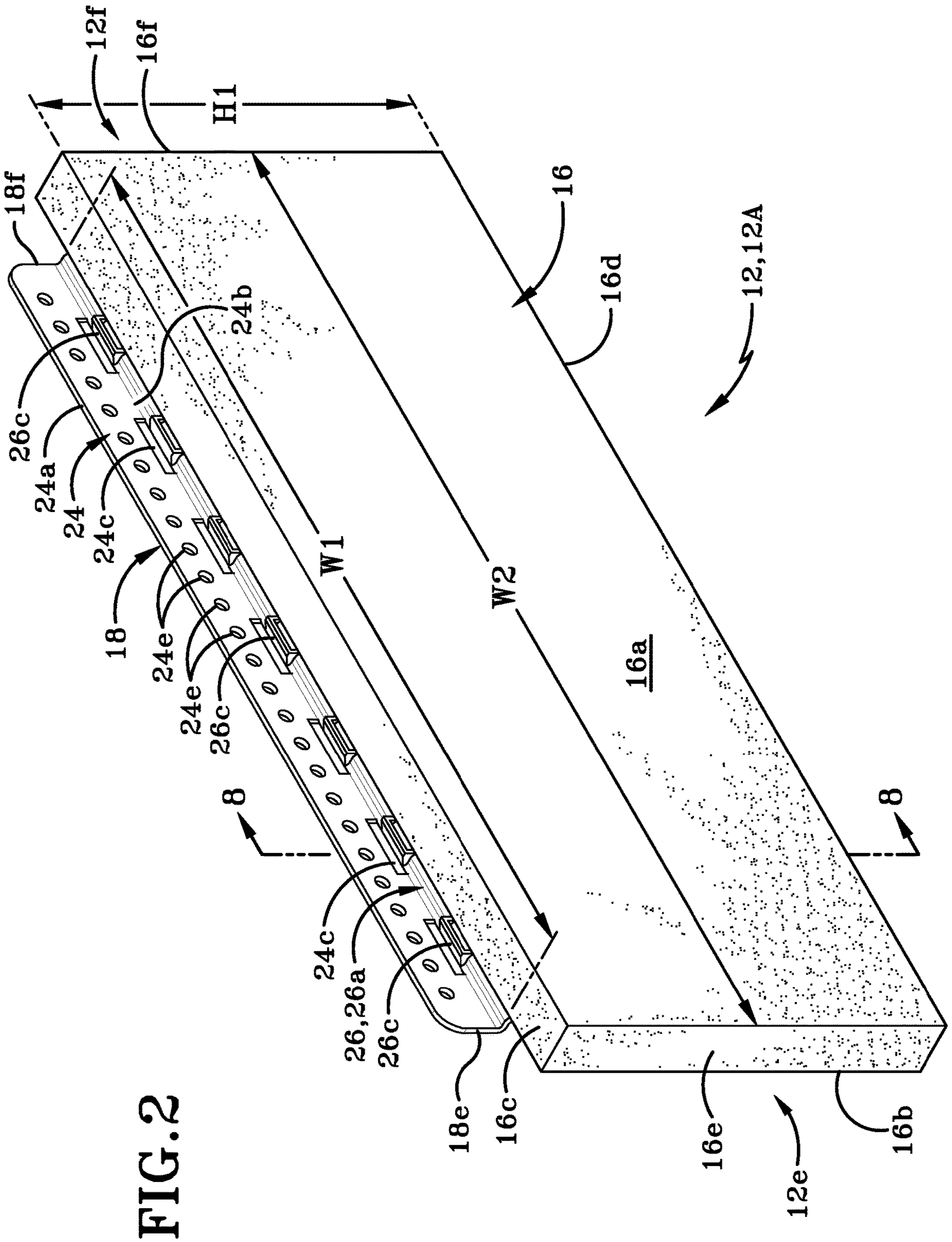
FIG. 2 is a front, top, left side isometric perspective view of a single panel in accordance with the present disclosure shown in isolation.
Figure 2A:
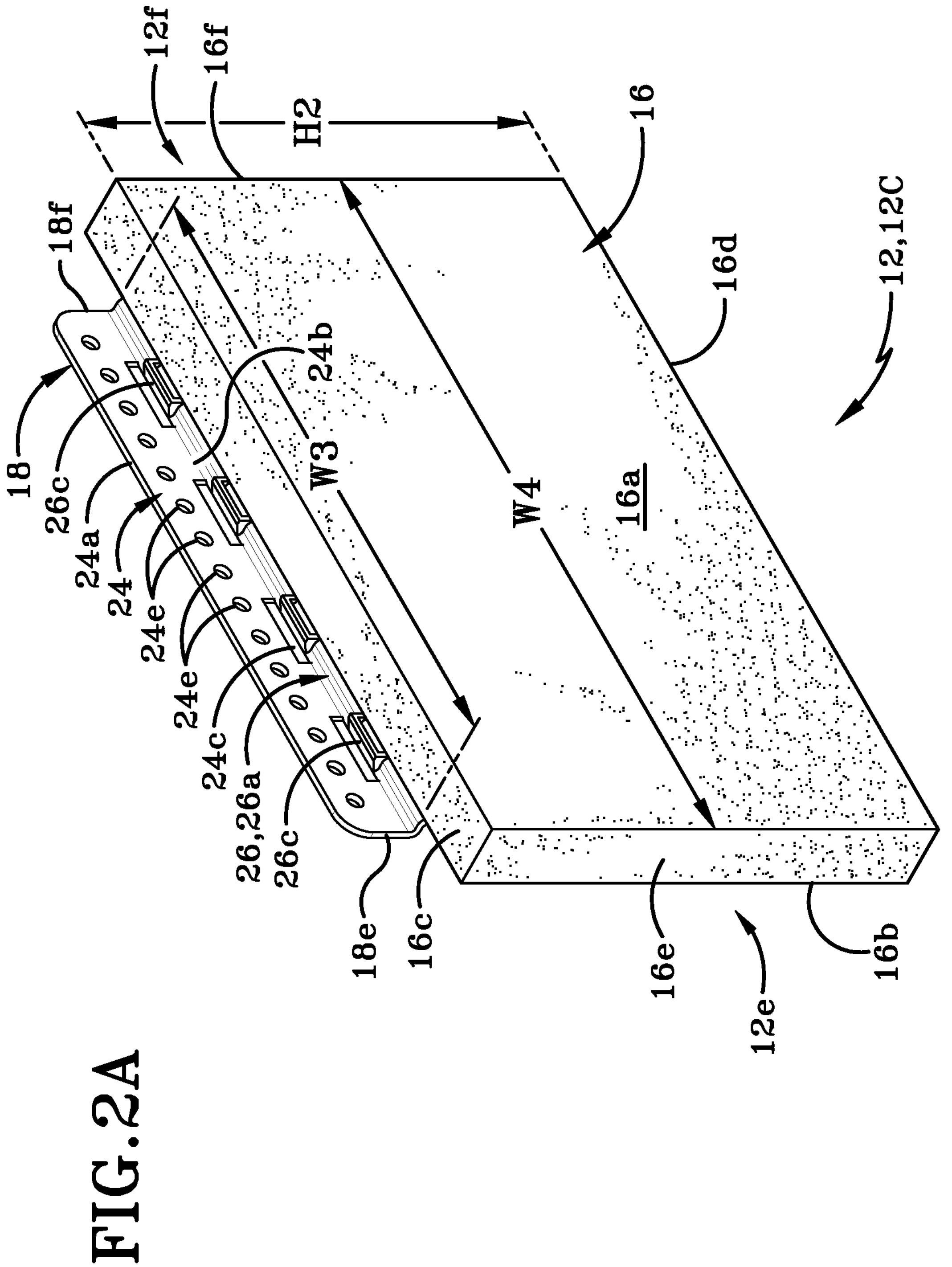
FIG. 2A is a front, top, left side isometric perspective view of a single panel in accordance with the present disclosure shown formed with different dimensions from the panel shown in FIG. 2.
Figure 3:
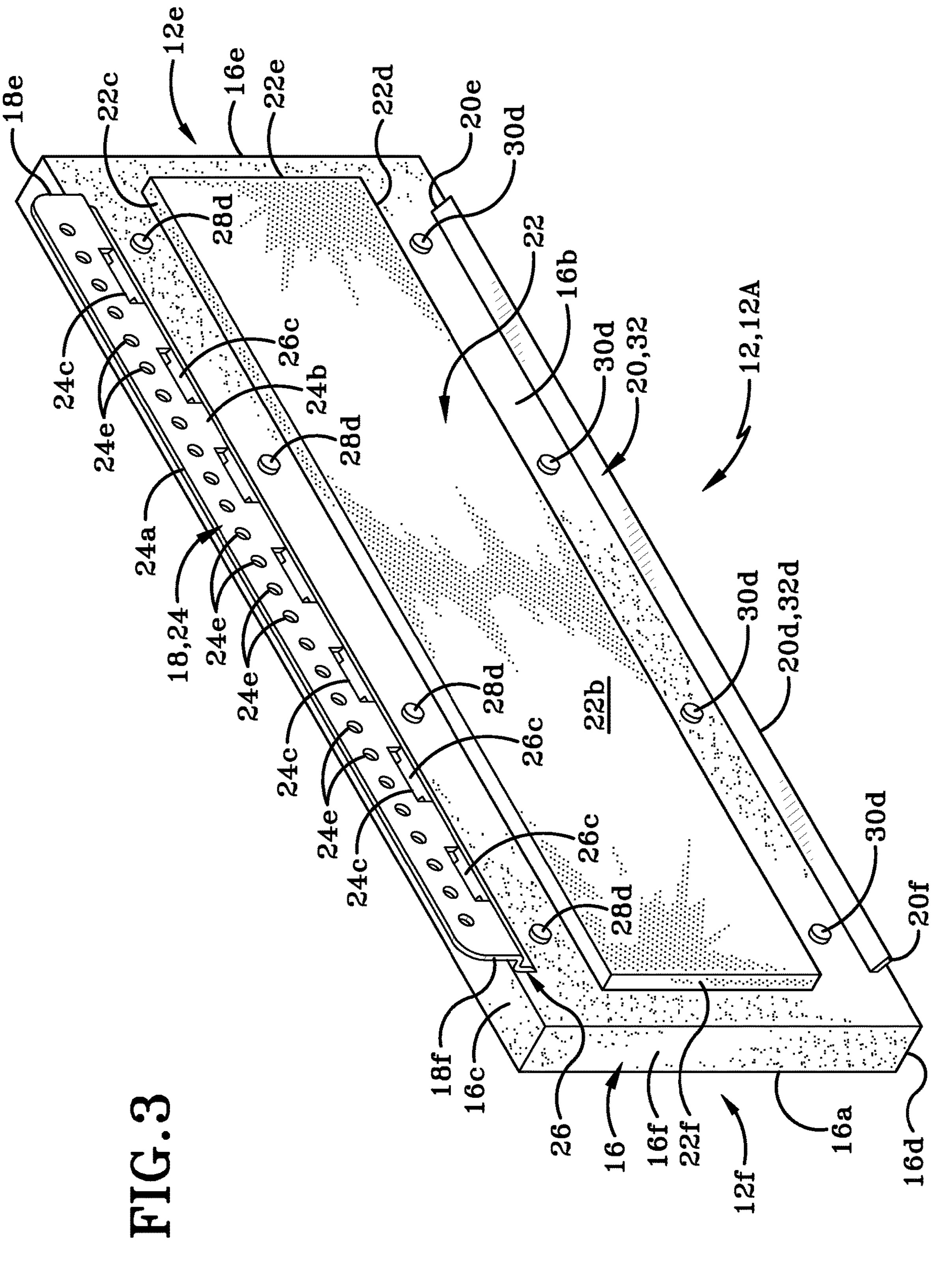
FIG. 3 is a back, top, right side isometric perspective view of the panel of FIG. 2.
Figure 3A:
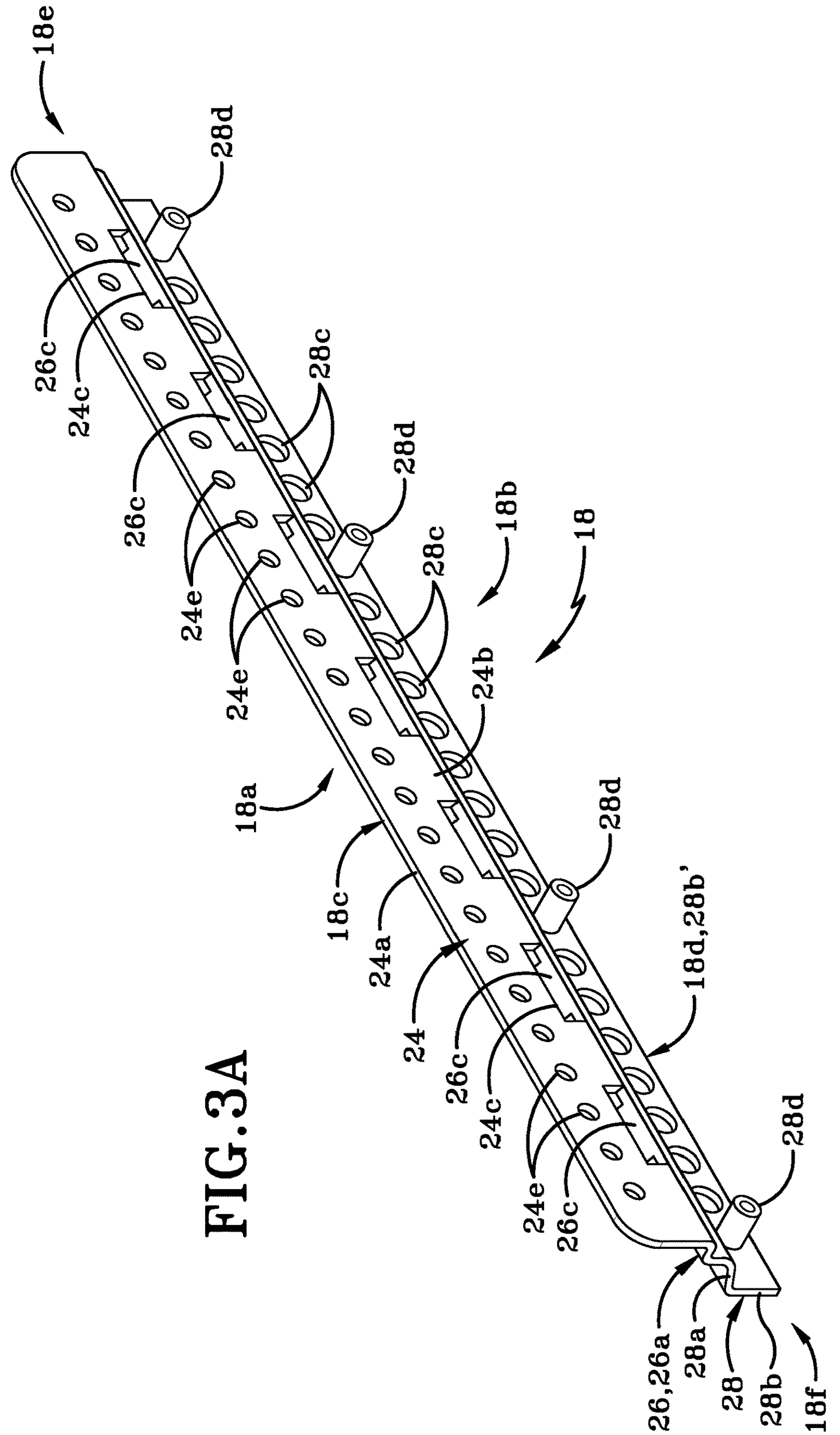
FIG. 3A is a back, top, right side isometric perspective view of a first bracket of the panel of FIG. 3 shown in isolation.
Figure 3B:
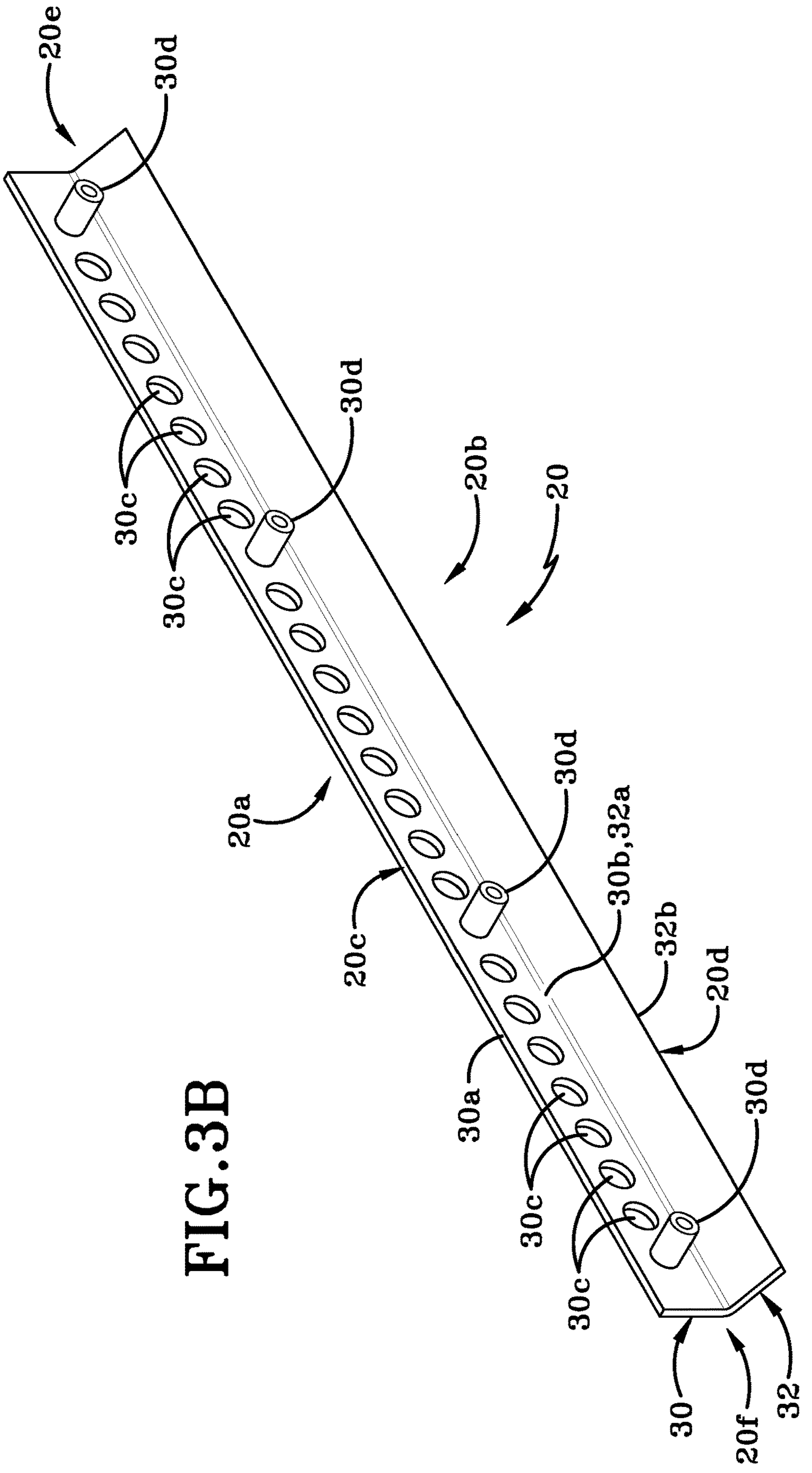
FIG. 3B is a back, top, right side isometric perspective view of a second bracket of the panel of FIG. 3 shown in isolation.

Referring now to FIGS. 2, 2A, and 3, an exemplary panel 12 in accordance with the present disclosure is shown in greater detail. FIGS. 2 and 3 show a panel 12A and FIG. 2A shows a panel 12C. The difference between panels 12A and 12B is the dimensions thereof, as will be discussed later herein. The exemplary panel 12 is comprised of a panel block 16 and an installation assembly for aligning and securing the panel block to a support surface "S". The installation assembly comprises a first bracket 18 and a second bracket 20 which are partially embedded within the panel block 12 during manufacture. Panel 12 also includes an insulator block 22 which is partially embedded within the panel block during manufacture. Second bracket 20 allows an installer assembling wall treatment 10 to position and align an associated panel 12 on a support surface "S". Insulator block 22 extends outwardly from panel block 16 and contacts the support surface "S". Once the panel block 16 and thereby the panel 12 is positioned and aligned on support surface "S" in the desired position, the installer secures the panel 12 to the surface using first bracket 18 and screws, nails or other suitable fasteners. Each of these aforementioned components will now be described in greater detail hereafter.

Panel block 16 is formed from a suitable material in any suitable manner. Suitable materials for casting panel block 16 include but are not limited to concrete, cementitious materials, composite materials, and a combination thereof. Panel block 16 may be formed in a desired size and shape by any suitable process which includes but is not limited to casting and molding. The suitable materials for fabricating panel block 16 will be referred to generally herein by the term "casting material" or "cast material". The suitable method for casting panel block 16 will be referred to generally herein by the terms "cast" or "casting".

Panel block 16 is cast so as to be of a desired shape and size to suit the application in which panel 12 is to be utilized. In some instances, such as in FIG. 2, panel block 16 is cast so that the end product is a generally rectangular cuboid. In other instances, such as in FIG. 2A, panel block 16 is cast so that the end product is a generally square cuboid.

During casting of panel block 16, a part of the first bracket 18 and a part of the second bracket 20 are at partially embedded in the casting material. The embedding of the part of first bracket 18 and the part of the second bracket 20 occurs while the casting material is still relatively formable and before that material hardens into a relatively rigid end component.

First bracket 18 and second bracket 20 are arranged in panel block 16 a distance vertically apart from one another. In particular, a lower end of first bracket 18 is vertically spaced from an upper end of second bracket 20 and such that the material of panel block 16 between first bracket 18 and second bracket 20 is comprised of only the casting material and the insulation material of insulator block 22, if provided. Specifically, the panel block between the lower end of first bracket 18 and the upper end of second bracket 20 is free of the material used to fabricate first bracket 18 and second bracket 20. FIGS. 2, 2A and 3 show that after casting, a part of the first bracket 18 and a part of the second bracket 20 extend outwardly from the casting material of the panel block 16, as will be described in greater detail hereafter.

In one embodiment, panel block 16 is cast from concrete. The cast panel block 16 has a front 16*a*, a back 16*b*, a top 16*c*, a bottom 16*d*, a first side 16*e*, and a second side 16*f*. Front 16*a* is opposed to back 16*c* and defines a longitudinal direction therebetween. Top 16*c* is opposed to bottom 16*d* and defines a vertical direction therebetween. First side 16*e* is opposed to second side 16*f* and defines a lateral direction therebetween.

Panel block 16 is formed in such a way that front 16*a* thereof has a decorative appearance such as that of stone or brick. The combination of the decorative fronts 16*a* of the plurality of panels 12 used in wall treatment 10 gives the treatment 10 a decorative desired appearance such as that of a natural stone wall or a brick wall. Panel block 16 is able to be formed in a variety of different shapes, sizes, and colors which varies the appearance of the assembled wall treatment 10. Panel blocks 16 preferably are fabricated in standard sizes so that wall treatment 10 may be quickly and easily assembled from the plurality of individual panels 12.

Figure 4:
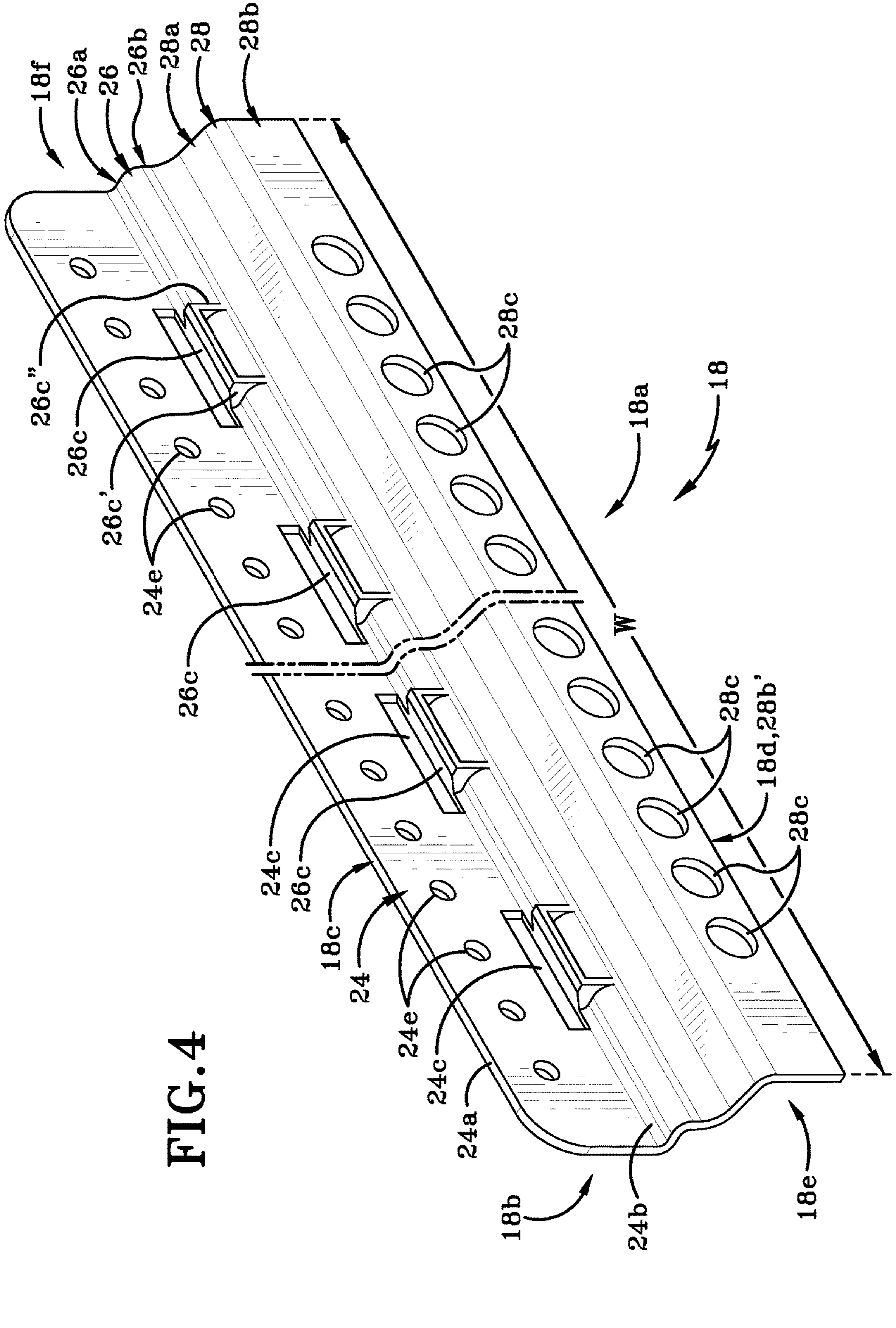
FIG. 4 is a front, top, left side isometric perspective view of a first bracket of the panel in accordance with the present disclosure shown in isolation.
Figure 7:
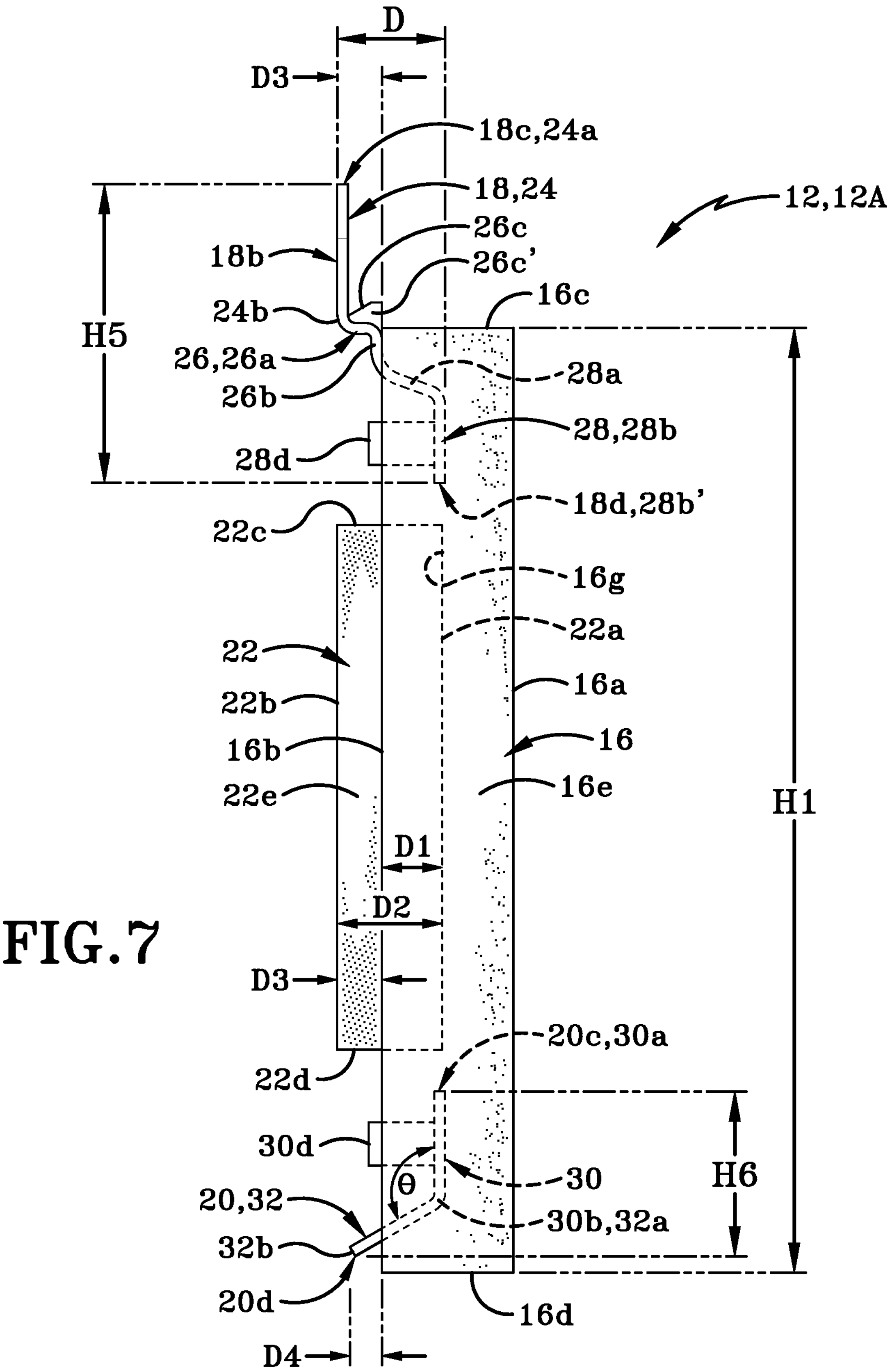
FIG. 7 is a left side elevation view of the panel of FIG. 2.
Figure 8:
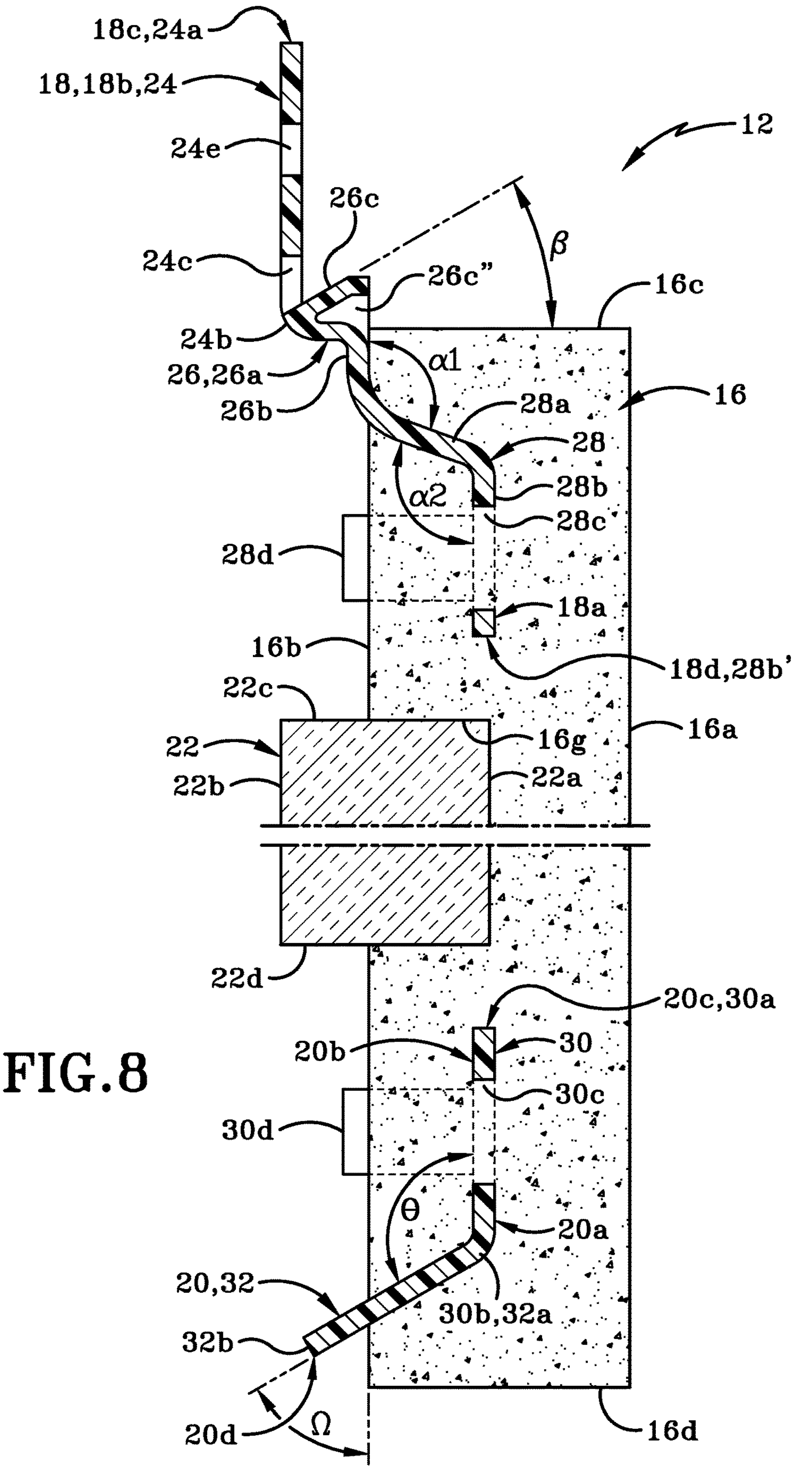
FIG. 8 is a cross-section of the panel in accordance with the present disclosure taken along line 8-8 of FIG. 2.

Referring now to FIGS. 4, 7, and 8, first bracket 18 will be described in greater detail. First bracket 18 is formed from any suitable material. Exemplary suitable materials include but are not limited to plastic materials; reinforced plastics; thermoplastic materials; composite materials; fiber composite materials; metals such as steel, particularly corrosion-resistant steel and stainless steel, aluminum, zinc, and copper; polymeric materials, reinforced wood; and a combination thereof. In a preferred embodiment, first bracket 18 (and second bracket 20) will be molded from a plastic such as Polyvinyl Chloride (PVC). Manufacturing first bracket 18 and second bracket 20 in this manner may reduce or eliminate the need for metal reinforcing components to ensure that the first bracket or second bracket on the hung panel does not creep or sag over time.

FIG. 4 shows first bracket 18 generally has a front 18*a*, a back 18*b*, a top 18*c*, a bottom 18*d*, a first side 18*e*, and a second side 18*f*. Front 18*a* faces in a same direction as front 16*a* of panel block 16, back 18*b* faces in a same direction as back 16*b* of panel block 16, top 18*c* faces in a same direction as top 16*c* of panel block 16, bottom 18*d* faces in a same direction as bottom 16*d* of panel block 16, first and second sides 18*e*, 18*f* faces in the same respective directions as first and second sides 16*e*, 16*f* of panel block 16.

First bracket 18 has a complex profile best seen in FIGS. 7 and 8. The profile is formed by shaping three distinct regions of first bracket 18, namely, first region 24, second region 26, and third region 28. First region 24, second region 26, and third region 28 are integrally formed with one another such that first bracket 18 is a monolithic, unitary component (although in other instances the various regions 24, 26, 28 may be separately formed and then be joined to one another.) Each of first region 24, second region 26, and third region 28 extends for the entire width "W" (FIG. 4) of first bracket 18, where the width "W" is measured from first side 18*e* of first bracket 18 to second side 18*f* thereof. FIG. 4 shows includes a dash-dot-dot break line indicating that the overall width "W" may be varied. FIG. 2, for example, shows a large panel 12A which has a first bracket 18 of a first width "W1". The panel block 16 on the large panel 12A is of a second width "W2" which is greater than the width "W1" of first bracket 18. (In some embodiments, the width "W1" is about 21 inches.) First bracket 18 is centered relative to the width "W2" of panel block 16. (In some embodiments, the width "W2" is about 24 inches.) Panel block 16 is shown in FIG. 2 to be of a height "H1". (In some embodiments, the height "H1" is about 9 inches.) It will be understood that partially embedding two separate brackets 18, 20 with panel block 16 during manufacture allows the manufacturer to make a variety of differently dimensioned panel blocks 16. Both the height "H1" and width "W2" of the panel block 16 may be varied as desired. The appropriate width first bracket 18 (and second bracket 20) will be selected according to the dimensions of the panel block 16 being cast.

FIG. 2A shows a smaller panel 12C which has a first bracket 18 of a third width "W3" which is smaller than "W1" or "W2". The panel block 16 of panel 12C is of a fourth width "W4" which is larger than the width "W3" but is again smaller than "W1" or "W2". Again, first bracket 18 is centered relative to the width "W4" of the panel block 16 of panel 12C. Panel 12C is of a height "H2" which may be greater than, equal to, or less than the height "H1" of panel 12A.

It will be understood that a medium-sized panel, such as panel 12B (FIG. 2) will have a first bracket 18 of a width that is sized between width "W1" and width "W3" and the associated panel block 16 will be of a width that is sized between width "W2" and "W4".

Figure 7A:
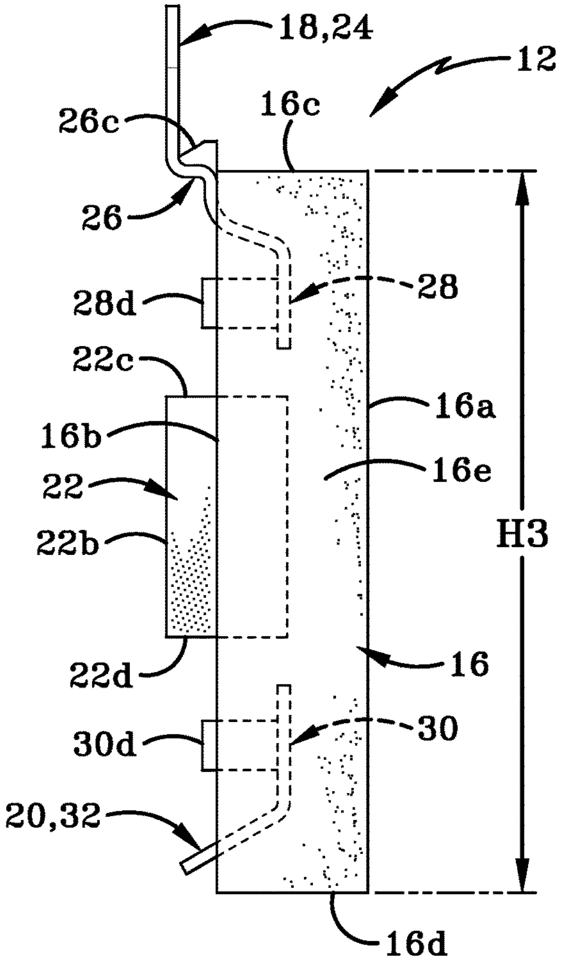
FIG. 7A is a left side elevation view of a smaller dimensioned panel in accordance with the present disclosure.
Figure 7B:
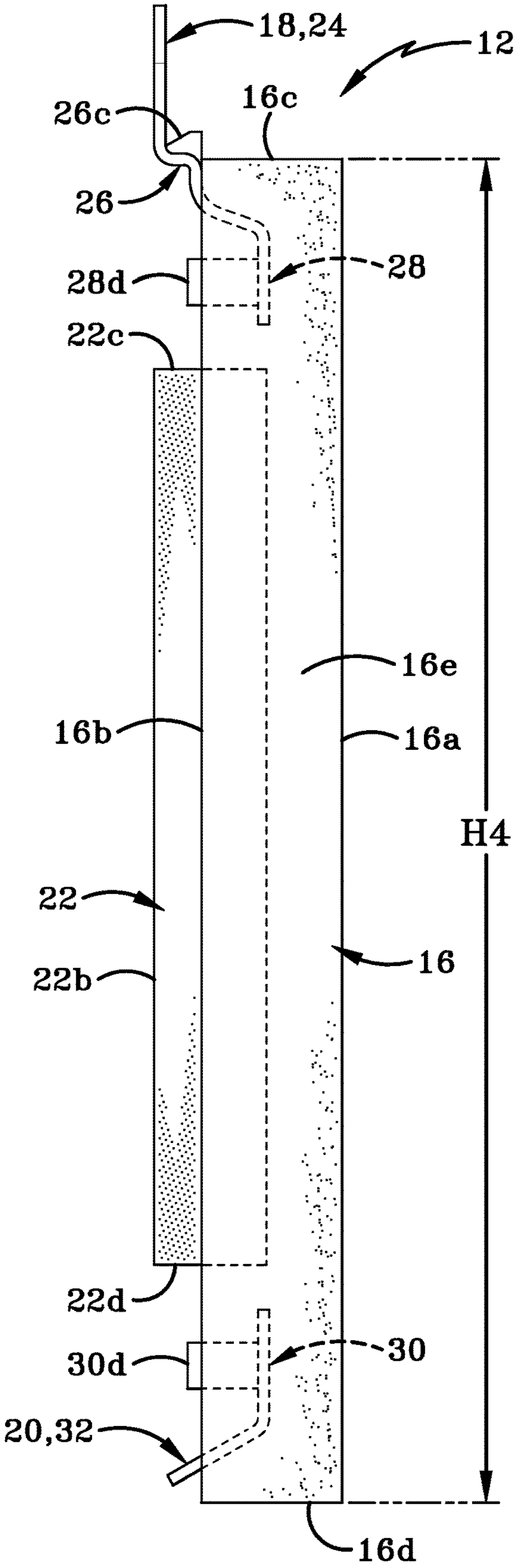
FIG. 7B is a left side elevation view of a larger dimensioned panel in accordance with the present disclosure.

Referring to FIGS. 7A and 7B, two differently sized panels 12 are illustrated. In both panels 12, the same first bracket 18 and second bracket 20 are utilized. However, the brackets 18, 20 are partially embedded in a smaller-dimensioned panel block 16 in FIG. 7A and the brackets 18, 20 are partially embedded in a larger-dimensioned panel block 16 in FIG. 7A. The smaller-dimensioned panel block 16 in FIG. 7A is of a height "H3" and the larger-dimensioned panel block 16 in FIG. 7B is of a height "H4". The height "H4" is greater than the height "H1" (FIGS. 2 and 7), or "H2" (FIG. 2A) or the height "H3" (FIG. 7B). The height "H3" is smaller than the heights "H1" and "H2". As stated elsewhere herein, providing two separate, individual brackets 18, 20 to align and anchor panel 12 enables a manufactured to cast a variety of panels having a range of widths and heights. The ability helps installers to build more natural-looking and aesthetically pleasing decorative wall treatments 10.

The different widths of first bracket 18 selectable for use in fabrication of panel 12 enables a manufacturer to make a variety of different width panels 12. The variable possible width of first bracket 18 is indicated in FIG. 4 by the reference character "W". When the different width panels, such as panels 12A, 12B, and 12C, illustrated in FIG. 1, are incorporated into a wall treatment 10, the end result is less linear in appearance than if panels of exactly the same width and height are utilized throughout the wall treatment 10.

First region 24 includes a top end 24*a* and a bottom end 24*b* spaced a distance vertically below top end 24*a*. First region 24, as best seen in FIG. 8 is substantially planar in configuration. Top end 24*a* of first region 24 forms the top 18*c* of first bracket 18. Second region 26, as best seen in FIG. 8, is generally L-shaped when first bracket 18 is viewed from one side. The L-shaped second region 26 includes a first leg 26*a* and a second leg 26*b* w. First leg 26*a* of second region 26 extends outwardly from bottom end 24*b* of first region 24 and is perpendicular to first region 24. First leg 26*a* and second leg 26*b* are generally perpendicular to one another. Second leg 26*b* extends downwardly from a front end of first leg 26*a* and in an opposite direction to first region 24. Second leg 26*b* is generally parallel to first region 24.

Third region 28 is integral with second region 26 and extends downwardly and forwardly from a lowermost end of second region 26. When third region 28 is viewed from the same side as second region 26, as in FIG. 8, third region 28 is generally of an "open" S-shape. Third region 28 includes a first arm 28*a* and a second arm 28*b*. First arm 28*a* extends downwardly and forwardly from the lowermost end of second leg 26*b* of second region 26. First arm 28*a* has an upper portion which is arcuate and angles downwardly at a first angle $\alpha$1 relative to second leg 26*b*. Second arm 28*b* is oriented at a second angle $\alpha$2 relative to first arm 28*b*. Second arm 28*b* is substantially parallel to second leg 26*b* and first region 24. Second arm 28*b* terminates at a lowermost end 28*b*' which forms the bottom 18*d* of first bracket 18.

First bracket 18 is of a height "H5" (FIG. 7) measured between top 18*c* and bottom 18*d* of first bracket 18, i.e., between top 24*a* of first region 24 and lowermost end 28*b*' of third region 28. In some embodiments, the height "H5" is about 2.846 inches. First bracket 18 is furthermore of a depth "D" (FIG. 7) measured between a back surface of first region 24 and a front surface of third region 28. In some embodiments, the depth "D" is about 1.025 inches.

Referring still to FIG. 4, first region 24 defines a plurality of weep holes 24*c* therein. Each weep hole 24*c* extends between a front surface and a back surface of first region 24 of first bracket 18. Weep holes 24*c* are spaced laterally from one another across the width "W" of first region 24. Each weep hole 24 is located vertically above a plane which extends along the top 16*c* of the panel block. Weep holes 24*c* are preferably located proximate an upper surface of first leg 26*a* of second region 26. Each weep hole 24*c* as illustrated is generally rectangular in shape and is formed by cutting a piece of material out of first region 24 along three edges. The lowermost edge of the material being cut from the first region 24 remains intact and is bent out of the plane of first region 24 to form a sloped wall 26*c*. FIG. 8 shows the sloped wall 26*c* is oriented at an angle β relative to the first leg 26*a* of second region 26. In some embodiments, angle β is about 60° relative to the front surface of first region 24. The sloped wall 26*c* angles upwardly and forwardly from where the back end of second region 26 joins bottom end 24*b* of first region 24. The opposing ends of the material cut from first region 24 to form each weep hole 24*c* are folded downwardly to an orientation perpendicular to upper surface of first leg 26*a* of second region 26. The folded ends are indicated as ends 26*c*' and 26*c*" and are generally triangular in shape when first bracket 18 is viewed from the side, as in FIG. 7. The folded ends 26*c*', 26*c*" help to retain sloped wall 26*c* at an angle relative to first region 24 and to direct water away from the front of the panel 12 and through the weep holes 24*c*.

Referring still to FIG. 4, first region 24 defines a plurality of apertures 24*e* therein. The apertures 24*e* are laterally spaced from one another across the width "W" of first region 24. Each aperture 24*e* extends between the front surface and back surface of first region 24. The plurality of apertures 24*e* is defined a distance vertically above the part of first region 24 which defines the plurality of weep holes 24*c* therein. Apertures 24*e* are provided to receive a fastener therethrough. Each panel 12 will be secured to support structure "S" via a few fasteners (not shown). The number of fasteners used to secure panel 12 in place will be considerably fewer than the number of apertures 24*e* provided in first region 24 of first bracket 18. The upper region 24 includes the plurality of apertures 24*e* in order for an installer to have options as to where the fasteners should be installed to correctly and adequately secure first bracket 18 to support structure "S".

Referring to FIG. 4, it can be seen that a plurality of openings 28*c* is defined in third region 28 of first bracket 18. Each of the plurality of openings 28*c* extends between a front surface of third region 28 and a back surface thereof. The openings 28*c* are spaced laterally from one another across the width "W" of first bracket 18. Openings 28*c* are of a greater diameter than the apertures 24*e* defined in first region 24. Openings 28*c* allow casting material to flow therethrough when first bracket 18 is embedded within the material when panel block 16 is formed. This arrangement helps to better embed third region 28 within the casting material of panel block 16.

Referring to FIGS. 7, 8 and 3, show that a plurality of bosses 28*d* extend outwardly from the back surface of third region 28. Bosses 28*d* are provided for mold registration during production of panel 12. Bosses 28*d* are cylindrical in cross-section and are used for positioning first bracket 18 during the molding process. The bosses 28*d* may be fixture mounted or may robotically inserted into the casting material (e.g., concrete) to position the first bracket 18 in the correct location. Each boss 28*d* is of a length which causes a portion of the boss 28*d* to extend outwardly beyond the rear 16*b* of panel block 16 after embedding the first bracket 18 in the concrete. Bosses 28*d* are spaced at lateral intervals from one another across the width "W" of first bracket 18.

As best seen in FIGS. 7 and 8, third region 28 of first bracket 18 is embedded in panel block 16. The only part of third region 28 which is not embedded in panel block 16 is the end portions of the various bosses 28*d*. These end portions extend beyond back 16*b* of panel block 16 as seen in FIG. 3. Second region 26 and first region 24 are not embedded in panel block 16. Second leg 26*b* of second region 26 abuts the back 16*b* of panel block 16. First leg 26*a* of second region 26 extends rearwardly outwardly from back 16*b* and is substantially flush with top 16*c* of panel block 16. First region 24 extends upwardly and outwardly from a backmost end of first leg 26*a* and beyond top 16*c* of panel block 16. Because of the configuration of first bracket 18, the portion thereof which is secured to the wall, i.e., first region 24, is located a distance rearwardly from back 16*b* of panel block 16. In other words, the second region 26 of first bracket 18 acts as a spacer and separates back 16*b* of panel block 16 from a front of support structure "S".

Figure 5:
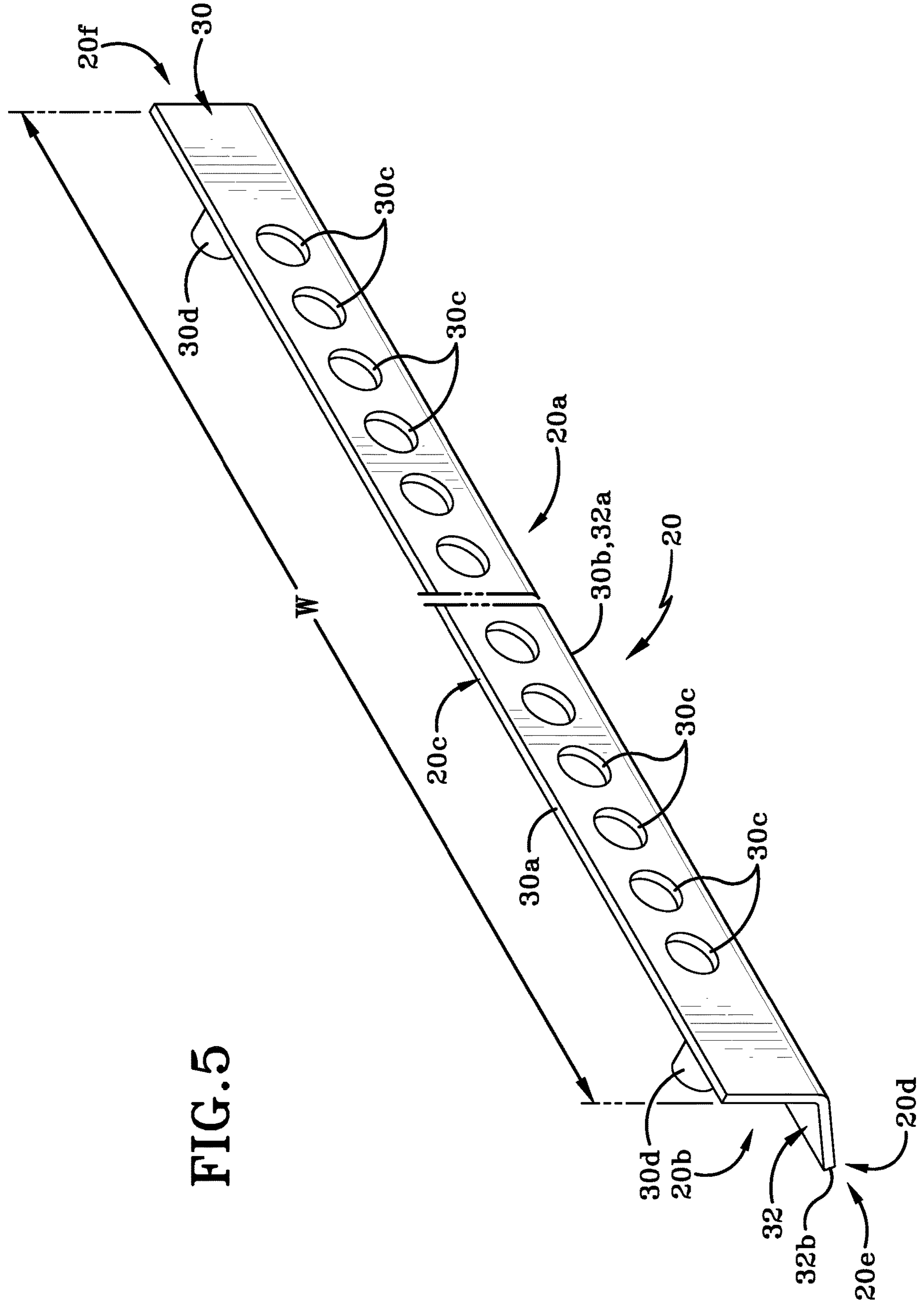
FIG. 5 is a top, front, left side isometric perspective view of a second bracket of the panel in accordance with the present disclosure, shown in isolation.

Referring now to FIGS. 5, 7, and 8, second bracket 20 is shown. Second bracket 20 is an open L-shaped component having a front 20*a*, a back 20*b*, a top 20*c*, a bottom 20*d*, a first side 20*e*, and a second side 20*f*. Second bracket 20 has a width "W" (FIG. 5) measured between first side 20*e* and second side 20*f*. The width "W" of second bracket 20 may be substantially equal to the width "W" of first bracket 18. It will be understood that in other embodiments the width of second bracket 18 may be greater than or smaller than the width of the first bracket 20.

FIG. 7 shows that second bracket 20 has a height "H6" measured from top 20*c* to bottom 20*d*. The height "H6" is smaller than the height "H5" of first bracket 18. It will be understood, however, that in other embodiments the height of second bracket 20 may be equal to or greater than the height of first bracket 20. FIG. 7 further shows that second bracket 20 is of a depth slightly less than "D" measured from front 20*a* of second bracket 20 to a rearmost tip 32*b* of the second portion 32 of second bracket 20.

Referring still to FIGS. 5, 7 and 8, second bracket 20 comprises a first portion 30 and a second portion 32 which are integrally formed with one another and are oriented at an angle Θ (FIG. 8) relative to one another. First portion 30 extends from a first end 30*a* to a second end 30*b*. First portion is substantially planar from first side 20*e* of second bracket 20 to second side 20*f* thereof. Second portion 32 extends from a first end 32*a* to a second end 32*b*. First end 32*a* of second portion 32 and second end 30*a* of first portion 30 are one and the same and form a corner between first portion 30 and second portion 32. FIG. 5 shows that a plurality of openings 30*c* are defined in first portion 30. Each opening 30*c* extends from a front surface of first portion 30 to a back surface thereof. Openings 30*c* may be similarly configured to openings 28*c* defined in third region 28 of first bracket 18 and serve the same purpose as openings 28*c*. Openings 30*c* allow casting material to flow therethrough when second bracket 20 is embedded within the material when panel block 16 is formed. This arrangement helps to better embed first portion 30 and part of second portion 32 within the casting material of panel block 16.

Referring to FIGS. 7, 8 and 3, show that a plurality of bosses 30*d* extend outwardly from the back surface of first portion 30 of second bracket 20. Bosses 30*d* are provided for mold registration during production of panel 12. Bosses 30*d* are cylindrical in cross-section and are used for positioning second bracket 20 during the molding process. The bosses 30*d* may be fixture mounted or may robotically inserted into the casting material (e.g., concrete) to position the second bracket 20 in the correct location within the concrete. Each boss 30*d* is of a length which causes a portion of the boss 30*d* to extend outwardly beyond the rear 16*b* of panel block 16 after partially embedding the second bracket 20 in the concrete. Bosses 30*d* are spaced at lateral intervals from one another across the width "W" of second bracket 20.

As is evident from FIGS. 7 and 8, first portion 30 of second bracket 20 is fully embedded within the material of panel block 16. Second portion 32 of second bracket 20 is partially embedded within the material of panel block 16 and a section 32*c* of second portion 32 extends outwardly beyond back 16*b* of panel block 16. Section 32*c* is oriented at an angle Ω relative to back 16*b*. In one embodiment angle Ω is 60°.

Referring to FIGS. 3, 7 and 8, an insulator block 22 is partially embedded within the panel block 16 when the panel block is being cast. Insulator block 22 is formed of any suitable insulation material such as closed-cell polypropylene (CCPP) foam. The closed-cell foam material will not tend to absorb moisture and therefore reduces the likelihood for mold or bacteria to grow on the back of panel block 16. The closed-cell foam may include an antibacterial additive or coating to even further reduce the tendency for mold and bacterial growth on panel block 16. Insulator block 22 is of smaller dimensions than the panel block 16. In one embodiment, panel block 16 is 9 inches high, 24 inches wide and 1.15 inches deep. In that same embodiment, insulator block is 5 inches high, 22 inches wide and 1 inch deep; however, only 0.5 inches of the insulator block is embedded within panel block 16. The other 0.5 inches of insulator block 22 extends outwardly and rearwardly from rear 16*b* of panel block 16.

Embedding at least part of the foam insulator block 22 as an insert within the material of panel block 16 displaces some of the material which would typically be used to fabricate the panel block 16. The resultant panel 12, which includes the foam insulator block 22 partially embedded within panel block 16, is lighter in weight than in if the entire panel block 16 were made of cementitious material, for example The lighter weight panel 12 is less cumbersome and expensive to package and ship, is less difficult for an installer to work with, and applies less load to a support structure "S" upon which the panel 12 is installed. Additionally, the presence of the insulator blocks 22 in the panels 12 of the wall treatment 10 provides some insulation value to the support structure "S", i.e., it improves the "R-value" of a building upon which the wall treatment 10 is installed. The presence of the insulator blocks 22 in panels 12 of wall treatment 10 reduces or mitigates rattling caused by wind or vibration.

Insulator block 22, as illustrated, is a rectangular cuboid in shape and includes a front 22*a*, a back 22*b*, a top 22*c*, a bottom 22*d*, a first side 22*e*, and a second side 22*f*. During formation of panel block 16, a recess 16*g* is formed within back 16*b* of panel block 16 and part of insulator block 22 is received in this recess 16*g*. Recess 16*g* may be formed the actual insertion of the insulator block 22 into the casting material of panel block 16 before that casting material has set or hardened. It will be understood that recess 16*g* is of a first depth "D1" (FIG. 7B) and insulator block 22 is of a second depth "D2", where "D2" is greater than "D1". As a result, a part of insulator block 22 extends outwardly for a distance "D3" beyond back 16*b* of panel block 16. The distance "D3" is the same distance that the back surface of first region 24 of upper block 18 is located away from back 16*b* of panel block 16. As a consequence, when panel 12 is placed against support structure "S" during installation thereon, the back 22*b* of insulator block 22 and the back surface of first region 24 will contact support structure "S". It will be noted, that the tip 32*b* of second bracket 20 does not extend the distance "D3" outwardly from back 16*b* of panel block 16. Instead, the tip 32*b* is located less than the distance "D3" from back 16*b*. In particular, tip 32*b* is located a distance "D4" away from panel block 16 that is shorter than the distance "D3" so that tip 32*b* can clear the thickness of first region 24 of first bracket 18. The thickness of first region 24 is measured between a front surface of first region 24 and a back surface thereof. (In one embodiment, the distance "D3" is 0.425 inches and therefore the distance "D4" is less than 0.425 inches by at least the thickness of first region 24.)

Figure 6:
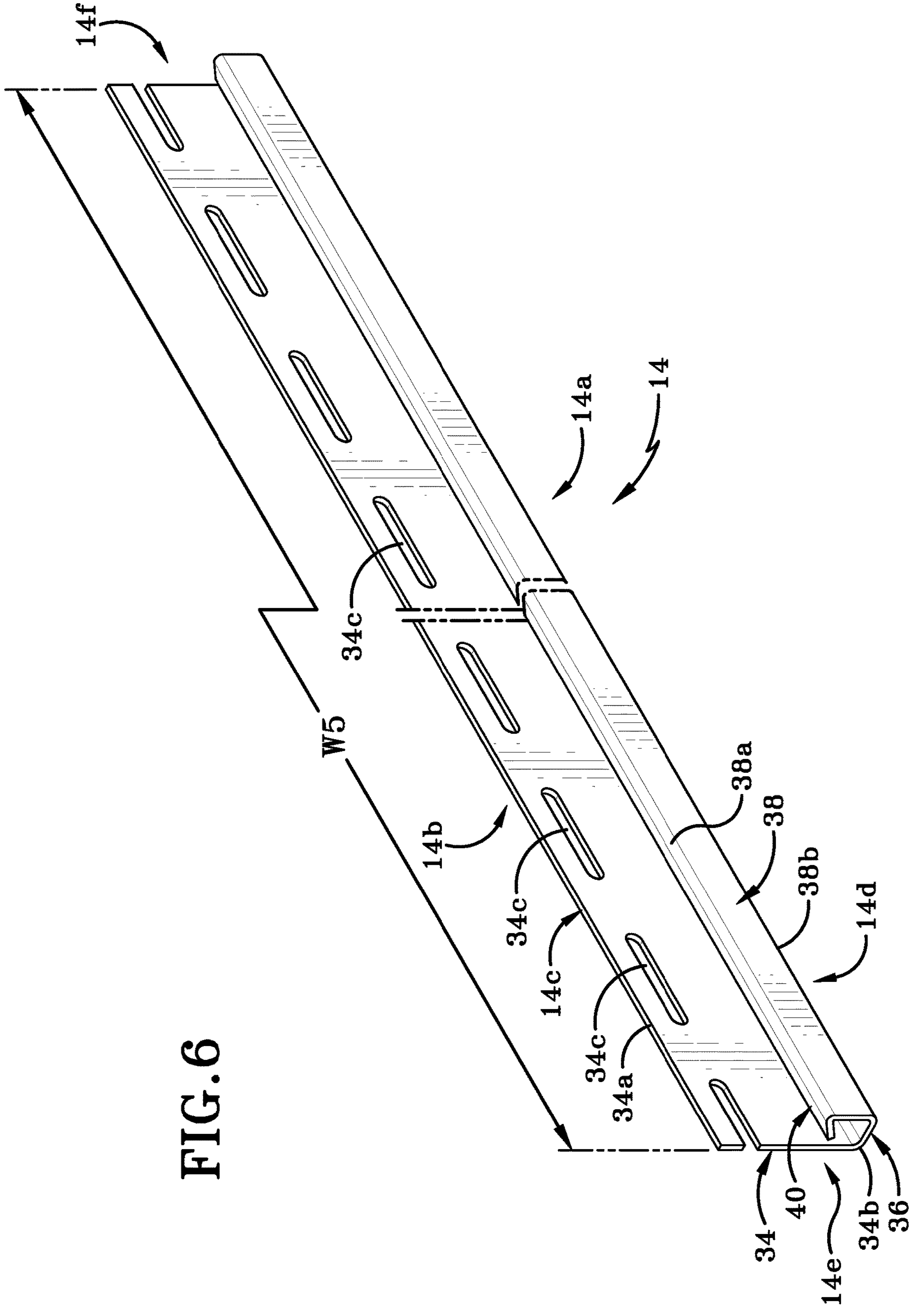
FIG. 6 is a top, front, left side isometric perspective view of a J-starter strip of the wall treatment in accordance with the present disclosure, with the starter strip shown in isolation.
Figure 9B:
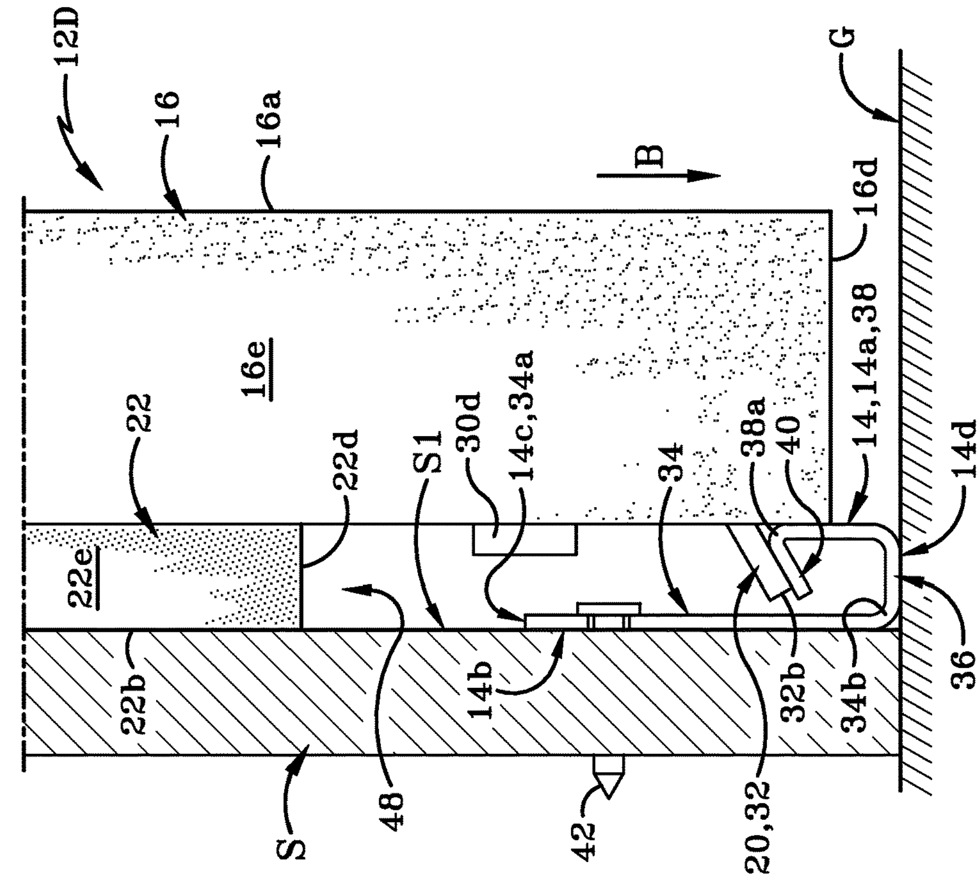
FIG. 9B is a partial left side elevation view of the first panel of the wall assembly positioned engaged with the starter strip.
Figure 9A:
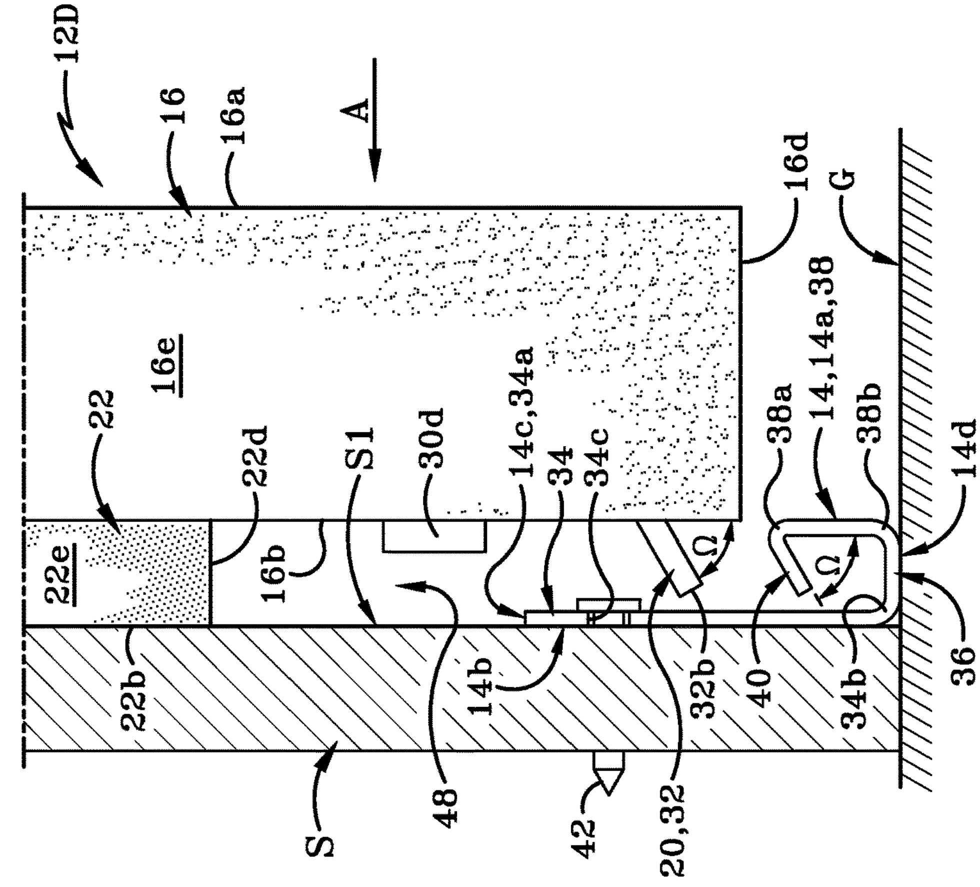
FIG. 9A is a partial left side elevation view of the starter strip installed on a wall and showing a first panel of the wall assembly positioned to be engaged with the starter strip.

Referring now to FIGS. 6 and 9A, as indicated earlier herein, wall treatment 10 includes a starter strip 14. Starter strip 14 generally has a front 14*a*, a back 14*b*, a top 14*c*, a bottom 14*d*, a first side 14*e*, and a second side 14*f*. Starter strip 14 is an integrally formed component comprised of a first section 34, a second section 36, a third section 38, and a fourth section 40.

First section 34 has a top 34*a* and a bottom 34*b* and is substantially planar along its width "W5", where the width "W5" is measured from first side 14*e* to second side 14*f*. FIG. 6 shows that width "W5" may be of any desired size including smaller or larger than any of the widths "W", "W1", "W2", "W3", or "W4". Since starter strip 14 is provided as the starting point for a plurality of panels 12 to be installed on support structure "S", width "W5" may be substantially larger than the width of any one panel 12. This is illustrated in FIG. 1 where starter strip 14 is shown to be of a length sufficient to be a starting point for at least four panels 12. In one embodiment, starter strip is about 36 inches long and about 1.5 inches high. A number of starter strips 14 may be installed on support surface "S" in end-to-end abutting contact in order to install wall treatment 10.

Referring again to FIG. 5, a plurality of laterally-oriented slots 34*c* is defined at intervals along the width of first section 34. Slots 34*c* are located a short distance vertically downwardly from top 34*a* and are provided to enable fasteners to be inserted therethrough and into support structure "S" when wall treatment 10 is installed on support structure "S".

Second section 36 extends perpendicularly outwardly and forwardly from bottom 34*b* of first section 34. Third section 38 extends perpendicularly outwardly and upwardly from a forwardmost end of second section 36. Third section 38 has a top 38*a* and a bottom 38*b*. Bottom 38*b* is integrally formed with the forwardmost end of second section 36. Top 38*a* of third section 38 is located a distance vertically above bottom 38*b* but is at a lower height relative to second section 36 than is top 34*a* of first section 34. This can be seen in FIG. 7.

Fourth section 40 of starter strip 14 extends downwardly and rearwardly from top 38*a* of third section 40. In particular, fourth section 40 is oriented at an angle Ω relative to third section 38 as can be seen in FIG. 7. This angle Ω is the same angle at which second portion 32 of second bracket 20 extends outwardly and rearwardly from back 16*b* of panel block 16.

As best seen in FIG. 9A, it should be noted that the depth of starter strip 14 is indicated as "D3" and this is the same depth to which insulator block 22 extends outwardly beyond rear 16*b* of panel block 16. The depth "D3" is also equal to the depth at which the rear of first region 24 of first bracket 18 is displaced rearwardly relative to the rear 16*b* of panel block 16.

A method of forming a panel 12 for a wall treatment 10 in accordance with the present disclosure comprises forming a panel block 12 from a material. The forming of the panel block 12 is accomplished by casting or molding the panel block from the material. The material selected for panel block 12 may be any suitable material for use in a wall treatment 10 such as a cementitious material, a composite material, or a combination of cementitious material and composite material. The material is initially in a flowable form, meaning that the material exhibits liquid-like properties and can be poured into a former or mold for casting or molding. The material is ultimately allowed to or caused to set or harden so that the end product is a solid, rigid structure which resembles a stone or a brick or other decorative member suitable for wall treatments. Once the material sets or hardens, the casting process is completed.

It will be understood that prior to casting the panel block 12, the desired height, width, and depth of the end product, i.e., panel block 12, is selected based on the proposed end use thereof in the wall treatment 10. A former or mold is selected which is appropriately dimensioned for casting the desired end height, width, and depth panel block 16.

During casting, i.e., when the material is not yet set or hardened, the method includes partially embedding a first bracket 18 in the material prior and partially embedding a second bracket 20 in the material prior. During the embedding process, the first bracket 18 and second bracket 20 are each retained in a desired position such that the two brackets are spaced a distance away from one another. Based on the desired dimensions of the end product panel block 12, the distance between a bottom 18*d* of the first bracket 18 and a top 20*c* of the second bracket 20 is varied. When the panel block 12 is to be of a greater height, the distance between first bracket 18 and second bracket 20 is larger than when the panel block is to be of a smaller height. The method further includes retaining a first region 24 of the first bracket 18 out of the material during casting such that the first region 24 extends outwardly beyond a top 16*c* (or first end) of the panel block 16 once casting is completed. The method further includes retaining a portion (i.e., part of second portion 32) of the second bracket 20 out of the material during casting such that the portion thereof is oriented at an angle relative to rear 16*b* of panel block 16 once casting is completed. The second bracket 20 is also retained so that a bottom 20 of the second bracket 20 is spaced a distance away from the bottom 16*d* of panel block 16 once cast. The bottom 16*d* of the panel block 16 is oriented perpendicular to the rear of the panel block 16.

The method in accordance with the present disclosure may also include partially embedding an insulator block within the material during casting, i.e., around the same time that the first bracket 18 and second bracket 20 are embedded in the material. Insulator block is formed of a foam material, particularly a rigid foam material. The foam material preferably is a CCPP foam that may include an antibacterial additive or coating. The foam material is of a lighter weight than the material being cast to form the panel block 16. The insulator block is retained in a position during casting which will ensure that, once casting is completed, part of insulator block 22 is embedded within the panel block 12 and another part of insulator block 22 extends outwardly beyond rear 16*b* of panel block 16. During casting, the insulator block is partially embedded in a location between first bracket 18 and second bracket 20. In particular, top 22*c* of insulator block 22 is spaced from the bottom 18*d* of first bracket 18 and bottom 22*d* of insulator block 22 is spaced from the top 20*c* of second bracket 20. The second bracket 20 is retained in a position during casting such that the portion of the second bracket which extends beyond rear 16*b* of panel block 16 once casting is complete, is located a distance below bottom 22*d* of the part of insulator block 22 extending outwardly from rear 16*b* of panel block 16.

It will be understood that insulator block 22 preferably will be selected to be of a size complementary to the side of the panel block 16 being cast. So, a larger dimensioned panel block 16 will have a larger dimensioned insulator block 22 and a smaller dimensioned panel block 16 will have a smaller dimensioned insulator block 22. Insulator block 22 is positioned generally centrally within in surface of the material being cast and such that the is a border of cast material which frames the insulator block 22 when the end product panel 12 is viewed from the back.

Once first bracket 18, second bracket 20, and insulator block 22 are all correctly positioned within the material being cast, the casting process is completed by allowing or causing the material to set or harden. The set or hardened material locks the first bracket 18 and second bracket 20 at least partially therein. The set or hardened material also locks insulator block 22 at least partially therein.

The installation of the decorative wall treatment 10 on support structure "S" will now be described with the aid of FIGS. 1, 9A, 9B, 10A, and 10B. It should be noted that wall treatment 10 is mortarless. In other words, mortar is not used to secure panels 12 or panel blocks to the support structure "S" or to one another. The manner of securing panels 12 to support structure "S" and to one another will be described later herein. The following description presumes that the support structure "S" itself has been adequately prepared for a mortarless wall treatment to be applied thereto, as is known in the art.

The first step in installing wall treatment 10 on support structure "S" is the installation of starter strip 14. Starter strip 14 is used to set the alignment of all panels 12 in wall treatment 10. A level line (not shown) is marked on the support structure "S" at a suitable short distance above the ground "G" (FIG. 9A). Rear **14*b* of starter strip 14 is placed in contact with front "S1" of support structure "S" and the top 14*c* of starter strip 14 is aligned with the level line. Fasteners 42 are inserted through some of the plurality of slots 34*c* defined in first section 34 of starter strip 14 to secure the same to support structure "S". The slots 34*c* through which fasteners 42 are inserted will be spaced at intervals from one another along the width "W5" of starter strip 14. Starter strip 14 is leveled and mounted to support surface "S" to establish level and straightness of the first row "R1" of panels 12**.

Once starter strip 14 is leveled and installed, the rear of first bracket 18 and insulator block 22 of first panel 12D are placed in abutting contact with front "S1" of support structure "S". First panel 12D is slid downwardly along front "S1" of support structure "S" in the direction indicated by arrow "B" (FIG. 9B) towards starter strip 14. The downward movement is continued until second portion 32 of second bracket 20 of first panel 12D comes to rest upon fourth section 40 of starter strip 14. Because of the complementary angles Ω of second portion 32 and fourth section 40, these two components 32, 40 are automatically aligned with one another. The starter strip 14 thus aligns the first panel 12D front to back. The installer is then able to slide panel 12D to the left or right along the fourth section 40 of starter strip 14 to place panel 12D in a desired installation position on support surface "S". For example, panel 12D may slide horizontally to the left (in FIG. 1) along starter strip 14 to butt up to a vertically-oriented frame member (not shown).

When panel 12D is in the position shown in FIG. 9A, the rear of first region 24 of first bracket 18 and the rear **22*b* of insulator block 22 on first panel 12D are in abutting contact with front "S1" of support structure "S". Additionally, the rear 16*b* of panel block 16 abuts the front of third section 38 of starter strip 14. Once panel 12D is correctly aligned by second portion 32 on starter strip 14 and has been moved horizontally to the desired location on the support surface "S", the installer will insert a plurality of second fasteners 44 (FIG. 10A) through selected apertures 24*c* (FIG. 4) of first bracket 18 to secure first bracket 18 and thereby first panel 12**D to support structure "S".

As shown in FIG. 9A, gap 46 is created between front "S1" of support surface "S". Apart from various structural components being situated between back **16*b* of panel block 16 and support surface "S", the gap 46 is of a generally constant size from proximate top 16*c* of panel block 16 to proximate bottom 16*d* of panel block 16**.

Once the first panel 12D has been installed adjacent starter strip 14, a second panel 12E (FIG. 1) is engaged with starter strip 14 in a similar manner as described above. Prior to installing second fasteners 44 to secure second panel 12E in place, second panel 12E is slid laterally along starter strip 14 until the first side **12*e* (FIG. 1) thereof butts up against the second end 12*f* of the first panel 12D. When in the desired position, second fasteners 44 are used to install second panel 12E on support surface "S". Once second panel 12E is fixedly installed on support structure "S", a third panel 12F is installed adjacent second panel 12E in the same way that second panel 12E was installed adjacent first panel 12D. The installation of successive panels continues until an entire first row "R1" (FIG. 1) of panels 12 has been leveled and aligned by starter strip 14**, and then secured to support structure "S".

Figure 10A:
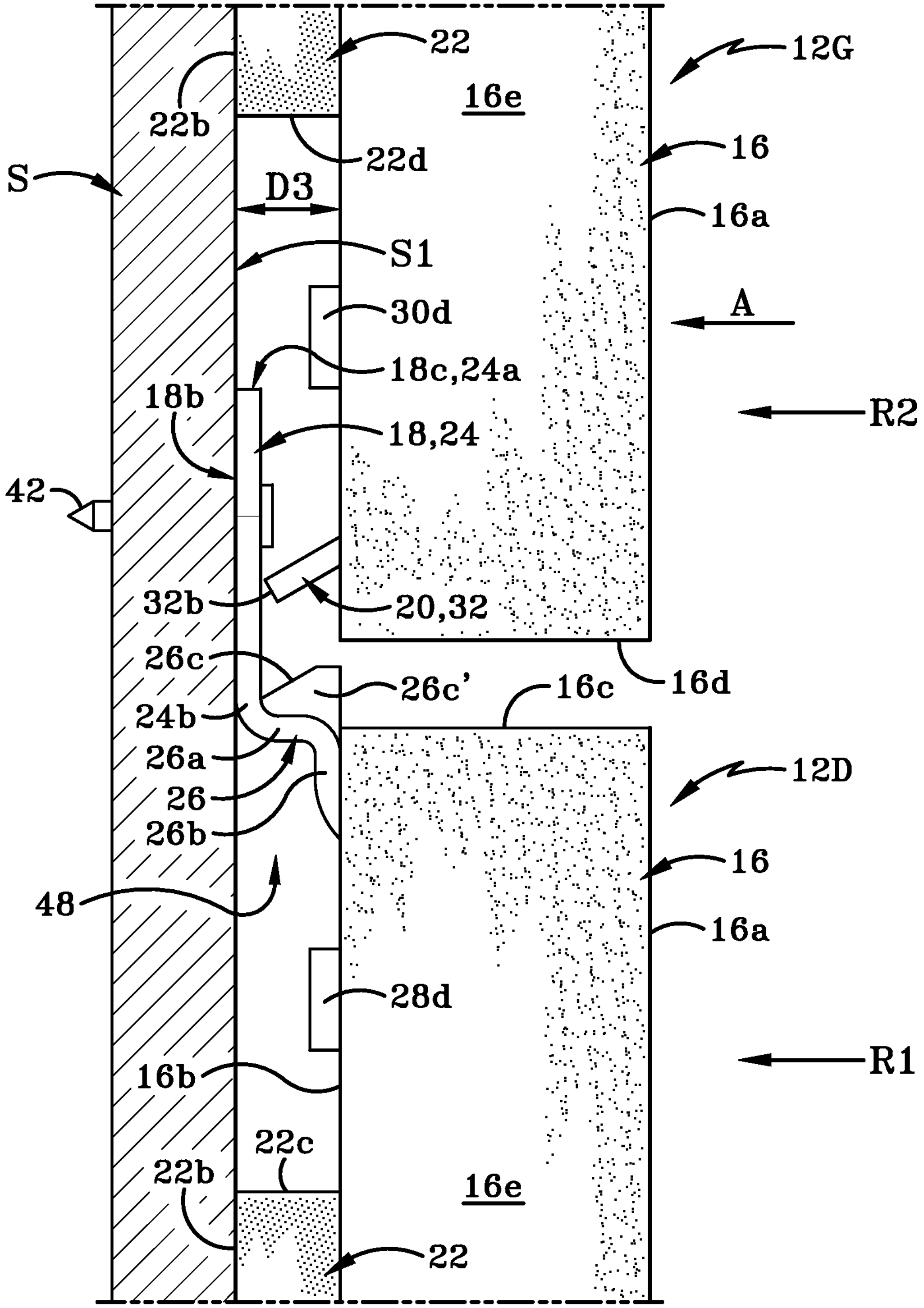
FIG. 10A is a partial left side elevation view of a second panel of the wall assembly positioned to be engaged with the first panel of FIG. 9B.
Figure 10B:
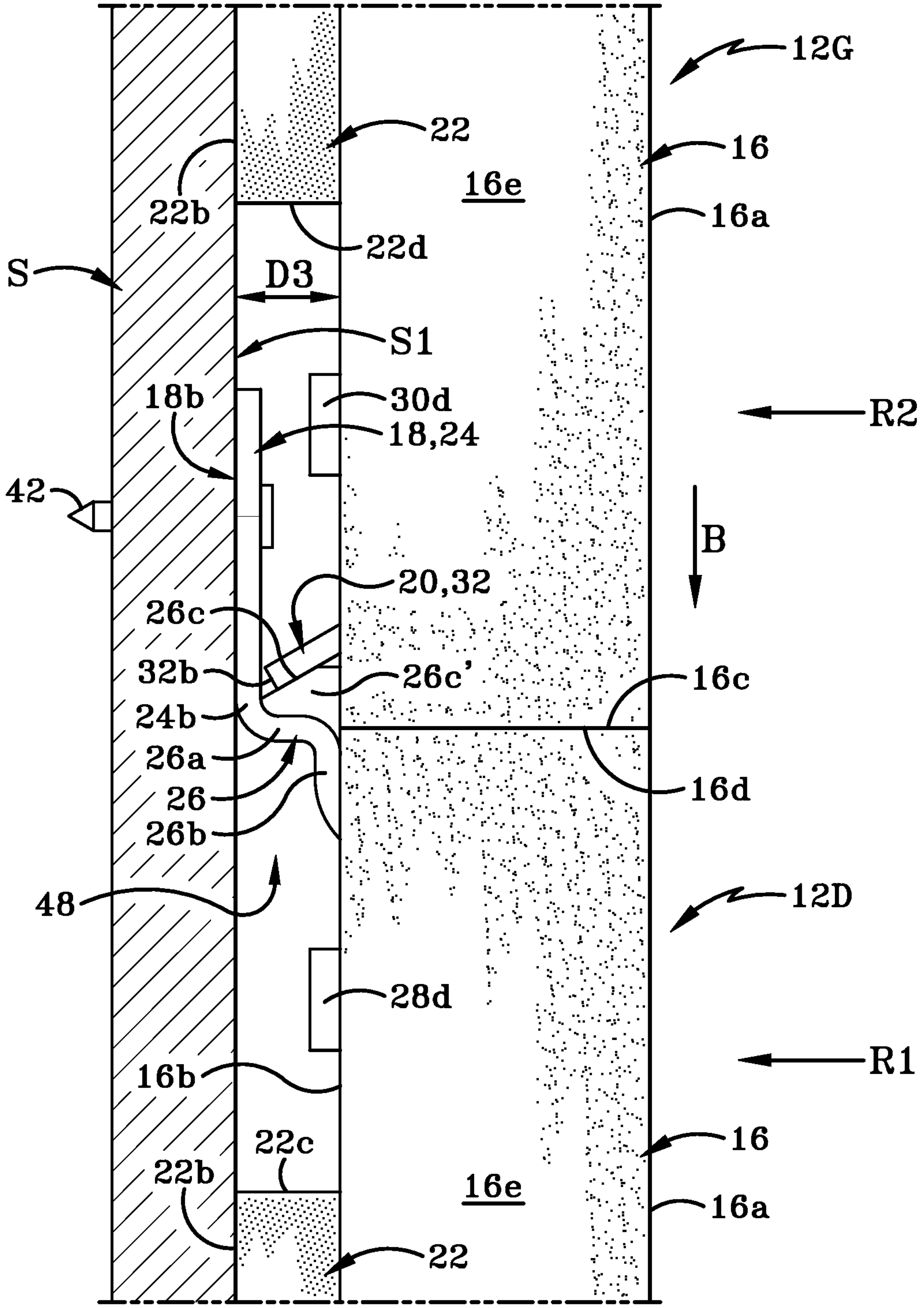
FIG. 10B is a partial left side elevation view of the second panel engaged with the first panel.

FIG. 10B shows the beginnings of a second row "R2" of panels 12 being secured to support structure "S". The figure shows a panel 12G positioned a distance vertically above first panel 12D and being moved in the direction "A" towards front "S1" of support structure "S". When rear **22*b* of insulator block 22 contacts front "S1", panel 12G is slid downwardly along front "S1" in the direction indicated by arrow "B" (FIG. 10B) until second portion 32 of second bracket 20 engages sloped wall 26*c* of first region 24 of first bracket 18 on panel 12. As mentioned previously herein, sloped wall 26*c* is arranged an angle β (FIG. 8) relative to first leg 26*a* of second region 26 of first bracket 18. The angle β is substantially equal in size to angle Ω of second portion 32 of second bracket 20. When second portion 32 contacts sloped wall 26*c*, panel 12G becomes aligned, front to back, with panel 12D. The installer may then slide panel 12G horizontally along sloped walls 26*c* of panel 12G to the left or right, in order to position panel 12G in a desired position on support surface "S" and relative to panel 12D. At this point, second fasteners 44 (not shown in FIG. 10B) are used to secure the first bracket 18 of panel 12G to support structure "S". The manner in which the first bracket 18 of a lower panel and the second bracket 20 of an upper panel become aligned with one another and are able to slide horizontally relative to one another and to the starter strip 14 before being secured in place, allows for a more random and natural aesthetic appearance of the wall treatment 10**.

The installer will then continue to install an additional panel 12H adjacent panel 12G in the same manner as second panel 12E is described earlier herein as being installed adjacent first panel 12D. The installer will continue installing additional panels in the second row "R2" and will then start installing panels in a third row and so on until the entire wall treatment 10 is installed on the support structure "S". It will be understood that the wall treatment 10 illustrated in FIG. 1 shows incomplete rows, such as "R1" and "R2" for descriptive purposes only. In an actual installation, the entire first row "R1" will be completed before the second row "R2"

is started and the entire second row "R2" will be completed before the third row is started.

It should be noted that no mortar is used to secure horizontally-adjacent panels 12 to one another. Similarly, no mortar is used to secure vertically-adjacent panels 12 to one another.

When wall treatment is fully installed on support surface "S", moisture accumulating on the fronts 16*a* of the panel blocks 16 will run down those front surfaces, flow into the weep holes 24*c* in first brackets 18 and flow into gap 46. The moisture will then tend to run down the backs 16*b* of the panel blocks and onto the ground "G" and then flow away from the support surface "S".

Figure 11:
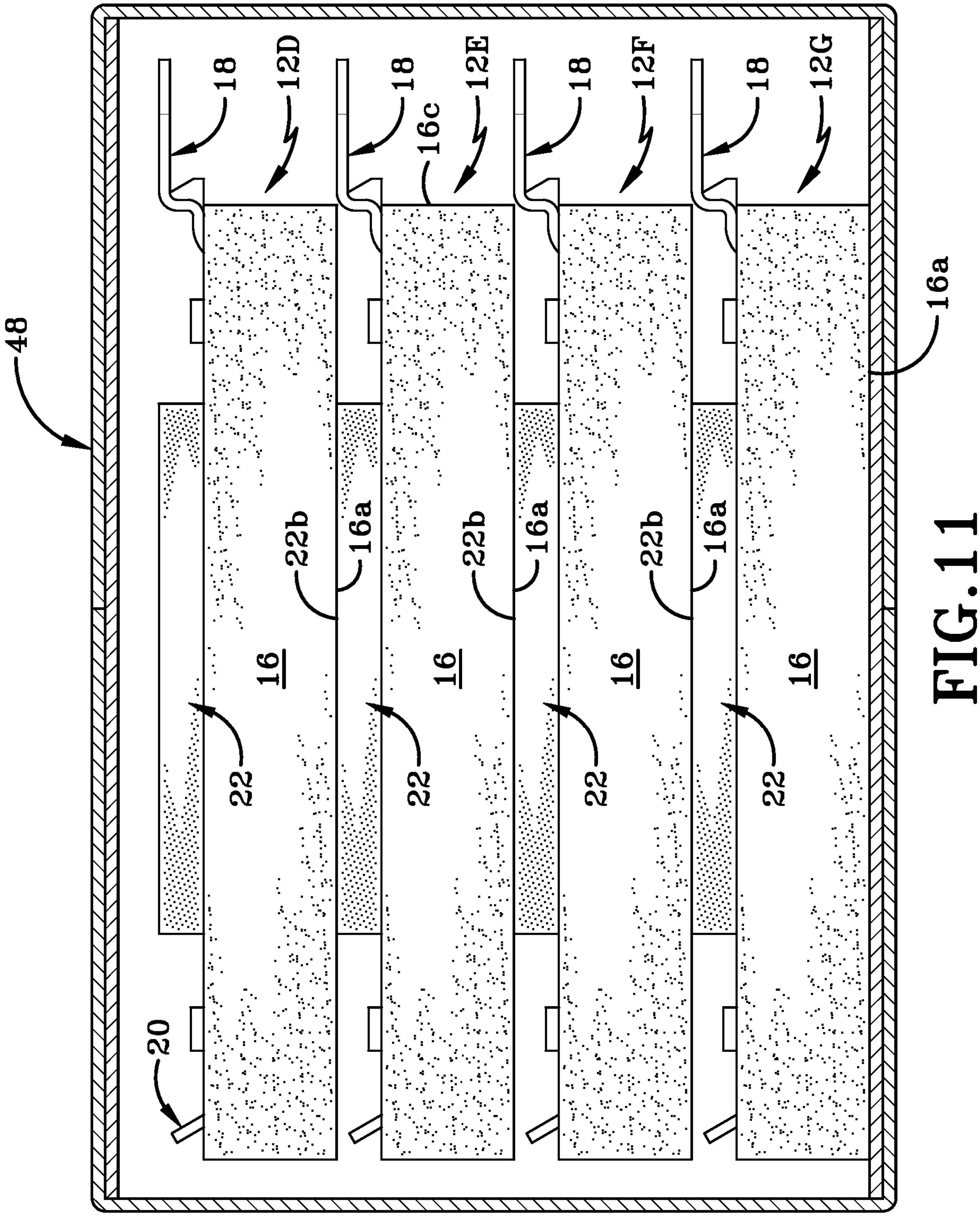
FIG. 11 is a packaging assembly for a plurality of decorative panels in accordance with the present disclosure being stacked one on top of the other, and showing the insulator blocks spacing adjacent panels a distance away from one another and thereby protecting the decorative exterior finish of the plurality of panels.

Turning now to FIG. 11, there is shown a manner of shipping a plurality of individual panels 12D, 12E, 12F, 12G in a single package (or box) 48. The panels 12D, 12E, 12F, 12G are stacked vertically one on top of the other in such a way that the decorative front of the panel block 16 of an upper panel in the stack is placed in contact with a rear of the insulator block 22 of a lower panel in the stack. For example, the front 16*a* of the panel block 16 of panel 12F is placed in contact with the rear 22*b* of the insulator block 22 of panel 12G. Similarly, the front 16*a* of the panel block 16 of panel 12E is placed in contact with the rear 22*b* of the insulator block of panel 12F. This arrangement ensures that there is no direct contact between the panel blocks 16 of adjacent panels in the stack. In other words, the insulator block 22 acts as dunnage to protect the panels 12D, 12E, 12F, and 12G during transport. In particular, the insulator blocks 22 protects the decorative fronts 16*a* of the various panels 12D, 12E, 12F, 12G from rubbing against the rear 16*b* of the adjacent panel and being damaged thereby. One additional benefit of this stacking arrangement is that there is less vibration of the panels in the package 48 because of the sandwiching of most of the panel blocks 16 between two insulator blocks 22. There is therefore less tendency for shocks and vibrations of the package 48 during shipping to cause panel blocks 16 to crack or break.

The fact that first bracket 18 and second bracket 20 are entirely separated from one another also allows the manufacturer to select to form panel blocks 16 which are of different heights, thereby giving the customer and installer greater choice when installing a wall treatment 10. The upper and second brackets 18, 20 therefore provide a way to create wider, narrower, taller, and shorter panel blocks 16 than were previously possible.

Figure 12:
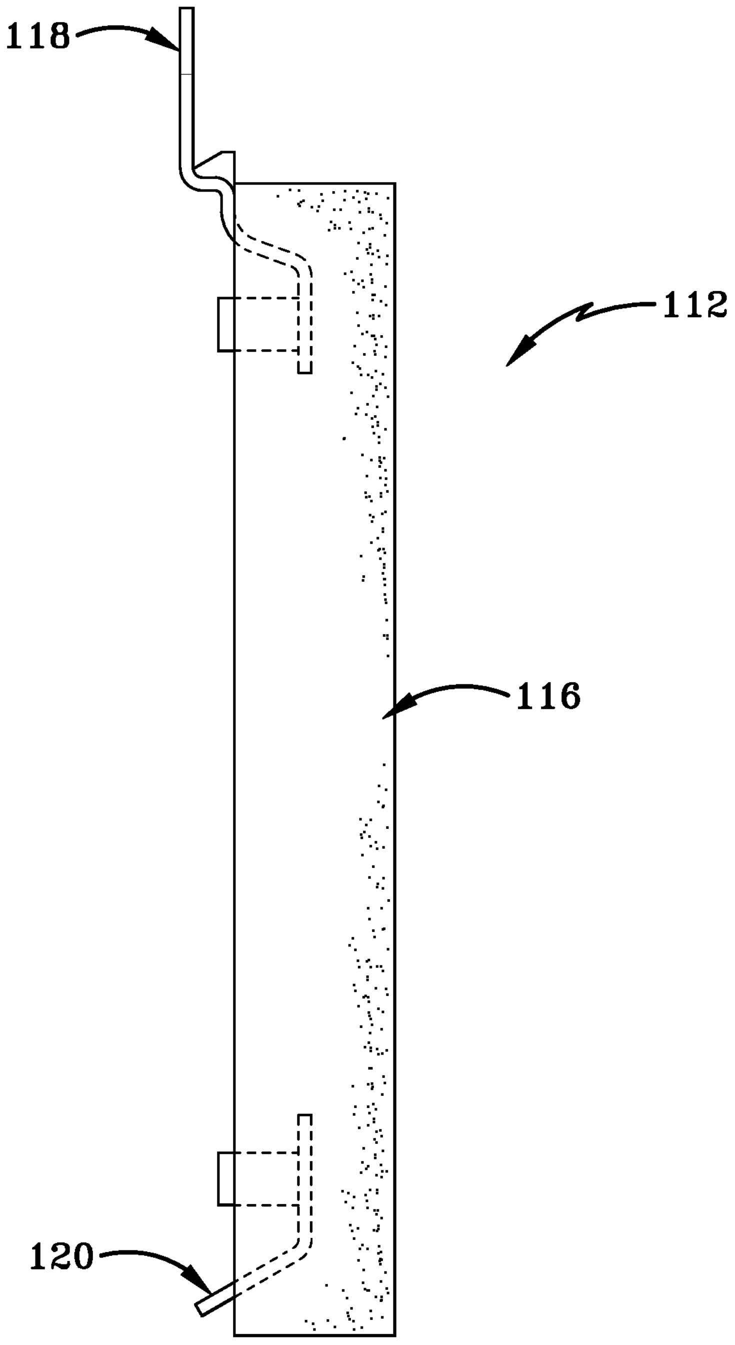
FIG. 12 is a left side elevation view of a second embodiment of a panel in accordance with the present disclosure.

FIG. 12 shows a second embodiment of a panel in accordance with the present disclosure, generally indicated at 112. Panel 112 is identical in structure and function to panel 12 in all respects except that there is no insulator block in panel 112. As a result, panel 112 is comprised of a panel block 116, a first bracket 118, and a second bracket 120.

It will be understood that while panels 12, 112 have been described herein as including an insulator block 22, 122, respectively, at least partially embedded in panel block 16, 116 thereof, in other embodiments, the insulator block 22, 122 may be omitted. In yet other embodiments, insulator block 22, 122 may not be embedded in the material of panel block 16 but may instead be adhered or otherwise secured to the back of the panel block 16. Obviously, in these latter embodiments, the weight advantage offered by embedding the insulator block in the material of the panel block is lost.

The present disclosure indicates that the insulator block 22 is partially embedded in the panel block 16 during casting. It will be understood that in other embodiments, the insulator block 22 may be fully embedded in the panel block 16. In these other embodiments, the back 16*b* of the panel block 16 will not be interrupted by the presence of the insulator block 22 as is the case in the present disclosure. Instead, in these other embodiments, the insulator block 22 will form a core of the panel block and be entirely surrounded by casting material. The weight-advantage and insulating property offered by insulator block 22 as a core of the panel block 16 will still be present in such embodiments. However, the protective advantages offered by the insulator block against damage of adjacent panels during shipping and the advantages in vibration reduction will be lost in embodiments where the insulator block forms the core of the panel block.

In some embodiments, the total depth of the panel 12 from front 16*a* of panel block 16 to the rear surface of first region 24 of first bracket 18 may be about 1.675 inches. The depth of the third region 28 of first bracket 18 which is embedded within the panel block may be about 0.5 inches, measured from rear 16*b* of panel block 16 to the front surface of second arm 28*b*. The depth of the foam insert, i.e., insulator block 22 may be about 1.0 inches measured from a front 22*a* of insulator block 22 to a rear 22*b* thereof. In some embodiments, about 0.425 inches of the insulator block 22 extends outwardly beyond rear 16*b* of panel block 16. In other words, 0.575 inches of the insulator block 22 is embedded within panel block 16. In some embodiments, the depth of the portion of the second bracket which is embedded within panel block, as measured from the front surface 20*a* of second bracket 20 to the back 16*b* of panel block 16 is about 0.5 inches. In some embodiments, the total height of the panel 12 as measured from top 18*c* of first bracket 18 to bottom 16*d* of panel block 16 is about 10.375 inches. The two separate installation brackets, i.e., first bracket 18 and second bracket 20, ae used for mounting, alignment of panels, and allows for panel blocks 16 to be cast in many different heights ranging from about 4 inches tall upward. Panels having all of these different height panel blocks may be easily installed using upper and second brackets 18, 20 which are embedded therein during casting of the associated panel blocks 16.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A panel for use in a wall treatment, said panel comprising:

a panel block having a front and a back;

an installation assembly engaged with the panel block, wherein said installation assembly is adapted to align and secure the panel block to a support surface;

an insulator block partially embedded in the back of the of the panel block;

a first bracket partially embedded within the panel block;

wherein a first region of the first bracket extends upwardly beyond a top of the panel block;

a second bracket partially embedded within the panel block a distance from the first bracket;

wherein the insulator block is located between the first bracket and the second bracket; and wherein the insulator block has a rear surface which is vertically aligned with a rear surface of the first region of the first bracket.

2. The panel according to claim 1, wherein a part of the insulator block extends outwardly for a distance beyond the back of the panel block.

3. The panel according to claim 1, wherein the panel block is comprised of a first material and the insulator block is comprised of a second material, and wherein the second material is lighter in weight than the first material.

4. The panel according to claim 1, wherein the panel block is comprised of a cementitious material, a composite material, or a combination thereof, and wherein the insulator block is comprised of a foam material.

5. The panel according to claim 4, wherein the foam material is a closed-cell foam.

6. The panel according to claim 4, wherein the foam material includes an antibacterial additive or coating.

7. The panel according to claim 1, wherein a portion of the second bracket extends outwardly from the rear of the panel block and a second distance away from the insulator block.

8. The panel according to claim 7, wherein the portion of the second bracket extends outwardly and downwardly at an angle relative to the rear of the panel block.

9. The panel according to claim 7, wherein a free end of the portion of the second bracket is vertically aligned with a rear surface of the insulator block.

10. A method of forming a panel for a wall treatment, said method comprising:

casting a panel block from a material;

partially embedding an insulator block within the material during casting such that a part of the insulator block extends outwardly beyond a surface of the material;

partially embedding a first bracket in the material during casting, wherein a first region of the first bracket extends upwardly beyond the surface of the material;

partially embedding a second bracket in the material a distance from the first bracket during casting;

locating the insulator block between the first bracket and the second bracket;

vertically aligning a rear surface of the insulator block with a rear surface of the first region of the first bracket;

completing the casting by setting or hardening the material; and engaging an installation assembly with the panel block, wherein said installation assembly is adapted to align and secure the panel block to a support surface.

11. The method according to claim 10, casting the panel block from a cementitious material, a composite material or a combination thereof.

12. The method according to claim 10, further comprising forming the insulator block out of a closed-cell foam material.

13. The method according to claim 10, wherein prior to casting the panel block the method further comprises:

selecting an end height of the panel block for use in the wall treatment; and varying the distance between the first bracket and the second bracket based on the end height.

14. The method according to claim 13, further comprising selecting a size of the insulator block based on the end height of the panel block.

15. The method according to claim 10, further comprising retaining a portion of the second bracket out of the material during casting such that the portion is oriented at an angle relative to the rear of the panel block once casting is completed, and such that the portion is located a distance below a bottom of the part of the insulator block which extends outwardly from the rear of the panel block.

* * * * *